US012803133B2

(12) United States Patent
Lee et al.

(10) Patent No.: US 12,803,133 B2
(45) Date of Patent: Nov. 17, 2026

(54) CAP PLATE ASSEMBLY, METHOD OF MANUFACTURING CAP PLATE ASSEMBLY, AND BATTERY CELL INCLUDING THE SAME

(71) Applicant: DYP CO., LTD., Ansan-si (KR)

(72) Inventors: Jeong-keun Lee, Hanam-si (KR); Wooseok Shim, Gunpo-si (KR); Tae-keun Park, Siheung-si (KR); Su-dong Jang, Incheon (KR); Jeho Shin, Seoul (KR); Ju-hyun Sun, Siheung-si (KR)

(73) Assignee: DYP CO., LTD., Ansan-si (KR)

( * ) Notice: Subject to any disclaimer, the term of this patent is extended or adjusted under 35 U.S.C. 154(b) by 509 days.

(21) Appl. No.: 18/500,699

(22) Filed: Nov. 2, 2023

(65) Prior Publication Data

US 2025/0079659 A1 Mar. 6, 2025

(30) Foreign Application Priority Data

Sep. 4, 2023 (KR) ........................ 10-2023-0117006

(51) Int. Cl.

| | |
|---|---|
| ***H01M 50/557*** | (2021.01) |
| ***B23K 26/21*** | (2014.01) |
| ***H01M 50/15*** | (2021.01) |
| ***H01M 50/176*** | (2021.01) |
| ***H01M 50/533*** | (2021.01) |
| ***H01M 50/562*** | (2021.01) |
| ***H01M 50/566*** | (2021.01) |
| ***H01M 50/588*** | (2021.01) |
| ***H01M 50/593*** | (2021.01) |

(52) U.S. Cl.
CPC ........... *H01M 50/557* (2021.01); *B23K 26/21* (2015.10); *H01M 50/15* (2021.01); *H01M 50/176* (2021.01); *H01M 50/533* (2021.01); *H01M 50/562* (2021.01); *H01M 50/566* (2021.01); *H01M 50/588* (2021.01); *H01M 50/593* (2021.01)

(58) Field of Classification Search
None
See application file for complete search history.

(56) References Cited

U.S. PATENT DOCUMENTS

| | | | |
|---|---|---|---|
| 9,437,846 | B2 | 9/2016 | Kim |
| 9,478,774 | B2 | 10/2016 | Byun et al. |
| 9,887,411 | B2 | 2/2018 | Guen et al. |

(Continued)

FOREIGN PATENT DOCUMENTS

| | | | |
|---|---|---|---|
| KR | 10-2003-0005800 | A | 1/2003 |
| KR | 10-2012-0060724 | A | 6/2012 |

(Continued)

*Primary Examiner* — Eli S Mekhlin
(74) *Attorney, Agent, or Firm* — Bridgeway IP Law Group, PLLC; Sang Ho Lee; Hyun Woo Shin

(57) ABSTRACT

The present disclosure relates to a cap plate assembly, a method of manufacturing a cap plate assembly, and a battery cell including the same. The cap plate assembly may include a cap plate formed to cover an upper side of a housing and having a first accommodation hole formed through at least a part of the cap plate so that the inside and outside of the housing communicate with each other, and a first electrode part coupled to the first through-hole from above and below the cap plate.

18 Claims, 17 Drawing Sheets

(56) References Cited

U.S. PATENT DOCUMENTS

| | | | | |
|---|---|---|---|---|
| 9,960,404 | B2 | 5/2018 | Moon et al. | |
| 2011/0052938 | A1* | 3/2011 | Lee | H01M 50/588 429/7 |
| 2011/0311863 | A1* | 12/2011 | Byun | H01M 50/176 429/181 |
| 2016/0086857 | A1* | 3/2016 | Zhang | B81B 7/0058 438/8 |
| 2019/0140252 | A1* | 5/2019 | Guen | H01M 50/588 |

FOREIGN PATENT DOCUMENTS

| | | | |
|---|---|---|---|
| KR | 10-1689215 | B1 | 12/2016 |
| KR | 10-1724013 | B1 | 4/2017 |
| KR | 10-2283793 | B1 | 7/2021 |

* cited by examiner

CAP PLATE ASSEMBLY, METHOD OF MANUFACTURING CAP PLATE ASSEMBLY, AND BATTERY CELL INCLUDING THE SAME

CROSS-REFERENCE TO RELATED PATENT APPLICATION

This application claims the priority and benefit of Korean Patent Application No. 10-2023-0117006, filed on Sep. 4, 2023, in the Korean Intellectual Property Office, the disclosure of which is incorporated herein in its entirety by reference.

BACKGROUND OF THE DISCLOSURE

1. Field of the Disclosure

The present disclosure relates to a cap plate assembly, a method of manufacturing the cap plate assembly, and a battery cell including the same, and more particularly, to a cap plate assembly used for a secondary battery, a method of manufacturing the cap plate assembly, and a battery cell including the same.

2. Description of the Related Art

In general, secondary batteries, which are used for electric vehicles and hybrid vehicles that require a large amount of electric power consumption, operate for a long period of time and require high electric power. Therefore, the secondary battery is used in the form of a battery module made by electrically connecting a plurality of batteries by using busbars and binding the plurality of batteries into a single unit. Further, the single-type battery may be used depending on the types of external devices applied to mobile devices, uninterruptible power supply devices, and the like.

Battery modules are preferred for fuel cells used for electric vehicles, hybrid vehicles, and the like because of outputs and capacities thereof. An output voltage or output current may be increased depending on the number of batteries embedded in the battery module.

In the secondary battery, an electrode terminal is installed to penetrate a cap plate. In this case, there is a problem in that an electrolyte leaks from a portion between the cap plate and the electrode terminal in the event of a malfunction of the secondary battery.

Therefore, a gasket or the like is installed between the cap plate and the electrode terminal to prevent a leak of the electrolyte, which causes a problem of an excessive increase in number of required components and difficulty in effectively preventing a leak of the electrolyte.

In case that an electrode of a positive electrode terminal part and an electrode of a negative electrode terminal part are made of different metallic materials, different types of metallic materials may be coupled between the positive electrode terminal part and the busbar or between the negative electrode terminal part and the busbar.

However, there is a problem in that the different types of metallic materials in the related art are difficult to join, and a process of joining the different types of metallic materials is complicated. Further, there is a problem in that a resistance value is high even after the different types of metallic materials are joined, which degrades efficiency in transmitting electric power in the secondary battery to the outside.

SUMMARY OF THE DISCLOSURE

The present disclosure has been made in an effort to solve the above-mentioned problem, and an object of the present disclosure is to provide a cap plate assembly, which is capable of effectively preventing a leak of an electrolyte between a cap plate and an electrode terminal, simplifying a process step, reducing resistance from an electrode assembly to a busbar, and improving efficiency in transmitting electric power, a method of manufacturing the cap plate assembly, and a battery cell including the same. However, the object of the present disclosure is illustrative, and the scope of the present disclosure is not limited by the object.

An embodiment of the present disclosure provides a cap plate assembly. The cap plate assembly may include: a cap plate formed to cover an upper side of a housing and having a first accommodation hole formed through at least a part of the cap plate so that the inside and outside of the housing communicate with each other; and a first electrode part coupled to the first through-hole from above and below the cap plate, in which the first electrode part includes: a first terminal plate made of a first material, connected to a busbar at a position disposed outside the housing, and seated and installed on an upper portion of the cap plate; a first insulation part having an upper portion having a first terminal seating portion on which the first terminal plate is seated, the first insulation part having a first through-hole formed in the first accommodation hole and being formed to space the first terminal plate and the cap plate; a first electrode terminal formed by stacking the first material and a second material, which is different from the first material, in a width or length direction of the cap plate, the first electrode terminal being inserted and coupled into the first through-hole so that a current is applied to the first terminal plate from the inside of the housing; and a first sub-plate made of the second material and connected to the first electrode terminal so as to apply the current to the first electrode terminal, the first sub-plate being connected to a lower portion of the first electrode terminal.

According to the embodiment of the present disclosure, the first insulation part may be formed on the cap plate and the first terminal plate by insert-injection molding so as to be formed between the cap plate and the first terminal plate.

According to the embodiment of the present disclosure, the first electrode terminal may include: a core portion made of the first material having an upper surface joined to the first terminal plate; and a clad portion made of the second material, formed to surround an outer surface of the core portion, and having a lower surface joined to the first sub-plate.

According to the embodiment of the present disclosure, the first terminal plate and the core portion may be joined by welding, and the clad portion and the first sub-plate may be joined by direct bonding.

According to the embodiment of the present disclosure, the first electrode terminal may include: an inner core portion made of the first material and having an upper surface joined to the first terminal plate; a clad portion made of the second material and formed to surround an outer surface of the core portion; and a base portion having a flat plate shape and joined to the core portion and a lower portion of the clad portion.

According to the embodiment of the present disclosure, the base portion and the clad portion may be joined by welding at least a part of a periphery of the clad portion on an upper portion of the base portion.

According to the embodiment of the present disclosure, the first terminal plate and the core portion may be joined by welding, and the base portion and the first sub-plate may be joined by welding.

According to the embodiment of the present disclosure, the cap plate assembly may include a third insulation part formed to be coupled to a lower portion of the cap plate to support the first sub-plate.

Another embodiment of the present disclosure provides a method of manufacturing a cap plate assembly. The method of manufacturing a cap plate assembly may include: (a) preparing a cap plate formed to cover an upper side of a housing and having a first accommodation hole formed through at least a part of the cap plate so that the inside and outside of the housing communicate with each other; (b) installing a first terminal plate, which is made of a first material and seated and installed on an upper portion of the cap plate so as to be connected to a busbar at a position disposed outside the housing, on an upper portion of the cap plate, spacing the first terminal plate and the cap plate, and forming a first insulation part having a first through-hole formed vertically through the first insulation part; (c) preparing a first electrode terminal formed by stacking the first material and a second material, which is different from the first material, in a width or length direction of the cap plate; (d) joining a first sub-plate, which is made of the second material so as to apply a current to the first electrode terminal, to a lower portion of the first electrode terminal; and (e) inserting the first electrode terminal into the first through-hole and joining the first terminal plate to an upper portion of the first electrode terminal so that the current is applied to the first terminal plate from an electrode assembly in the housing.

According to the embodiment of the present disclosure, in step (b), the first insulation part may be formed by forming the cap plate and the first terminal plate by insert-injection molding so that the first insulation part is formed between the cap plate and the first terminal plate.

According to the embodiment of the present disclosure, step (c) may include: (c-1) preparing a core material portion made of the first material so as to be joined to the first terminal plate and extending by a predetermined length in a length direction; (c-2) coupling a clad portion, which is made of the second material so as to be joined to the first sub-plate, to surround a periphery of the core material portion; and (c-3) forming the first electrode terminal by cutting, in a direction perpendicular to the length direction, the core material portion surrounded by the clad portion.

According to the embodiment of the present disclosure, the first sub-plate and the first electrode terminal may be joined by direct bonding in step (d), and the first terminal plate and the core portion may be joined by welding in step (c).

According to the embodiment of the present disclosure, step (c) may include: (c-1) preparing a core material portion made of the first material so as to be joined to the first terminal plate and extending by a predetermined length in a length direction; (c-2) coupling a clad portion, which is made of the second material so as to be joined to the first sub-plate, to surround a periphery of the core material portion; (c-4) cutting, in a direction perpendicular to the length direction, the core material portion surrounded by the clad portion; and (c-5) forming the first electrode terminal by joining a base portion having a flat plate shape to the cut core material portion and a lower portion of the clad portion.

According to the embodiment of the present disclosure, in step (c-5), the base portion and the clad portion may be joined by performing welding along at least a part of a periphery of the clad portion on an upper portion of the base portion.

According to the embodiment of the present disclosure, the first sub-plate and the base portion may be joined by welding in step (d), and the first terminal plate and the core portion may be joined by welding in step (c).

According to the embodiment of the present disclosure, step (c) may include: (c-6) preparing a core portion made of the first material so as to be joined to the first terminal plate; and (c-7) forming the first electrode terminal by joining a clad portion, which is made of the second material so as to be joined to the first sub-plate, to at least a part of an outer surface of the core portion.

According to the embodiment of the present disclosure, the method may include: (f) coupling a third insulation part, which is formed to support the first sub-plate, to an upper portion of the first sub-plate prior to step (e).

Still another embodiment of the present disclosure provides a battery cell. The battery cell may include: an electrode assembly having first and second electrodes provided at two opposite surfaces of a separator; a housing having an electrode accommodation portion therein and configured to accommodate the electrode assembly; and a cap plate assembly including a first electrode part connected to the first electrode and installed in a conductive state on a cap plate formed to cover an upper side of the housing and having a first through-hole formed so that the inside and outside of the housing communicate with each other, and a second electrode part connected to the second electrode and installed in an insulated state in a second through-hole formed in the cap plate, in which the first electrode part includes: a first terminal plate made of a first material and seated and installed on an upper portion of the cap plate so as to be connected to a busbar at a position disposed outside the housing; a first insulation part having an upper portion having a first terminal seating portion on which the first terminal plate is seated, the first insulation part having a first through-hole formed in the first accommodation hole and being formed to space the first terminal plate and the cap plate; a first electrode terminal formed by stacking the first material and a second material, which is different from the first material, in a width or length direction of the cap plate, the first electrode terminal being inserted and coupled into the first through-hole so that a current is applied to the first terminal plate from the inside of the housing; and a first sub-plate made of the second material and connected to the first electrode terminal so as to apply the current to the first electrode terminal, the first sub-plate being connected to a lower portion of the first electrode terminal.

According to the embodiment of the present disclosure, the first electrode terminal may include: a core portion made of the first material having an upper surface joined to the first terminal plate; and a clad portion made of the second material, formed to surround an outer surface of the core portion, and having a lower surface joined to the first sub-plate.

According to the embodiment of the present disclosure, the second electrode part may include: a second terminal plate made of the first material and seated and installed on an upper portion of the cap plate so as to be connected to the busbar; a second insulation part having an upper portion having a second terminal seating portion on which the second terminal plate is seated, the second insulation part having a second through-hole formed in the second accommodation hole and being formed to space the second terminal plate and the cap plate; a second electrode terminal made of the first material so that a current is applied to the second terminal plate from the inside of the housing, the second electrode terminal being inserted and coupled into the second through-hole; and a second sub-plate made of the first material and connected to the second electrode terminal so as to apply the current to the second electrode terminal, the second sub-plate being connected to a lower portion of the second electrode terminal.

According to the embodiment of the present disclosure configured as described above, the cap plate and the electrode terminal may be coupled by insert-injection molding, thereby effectively preventing a leak of the electrolyte between the cap plate and the electrode terminal, simplifying the manufacturing process of coupling a sealing member such as a gasket, improving production efficiency, and reducing manufacturing and process costs.

It is possible to implement the cap plate assembly, which is capable of increasing the junction area between the components by using an extruded clad material, and improving efficiency in transmitting electric power by reducing resistance between different types of materials from the electrode assembly to the busbar, a method of manufacturing a cap plate assembly, and a battery cell including the same. Of course, the scope of the present disclosure is not limited by the effects.

BRIEF DESCRIPTION OF THE DRAWINGS

The above and other features and advantages of the present disclosure will become more apparent by describing in detail embodiments thereof with reference to the attached drawings in which.

DETAILED DESCRIPTION OF THE DISCLOSURE

Figure 1:
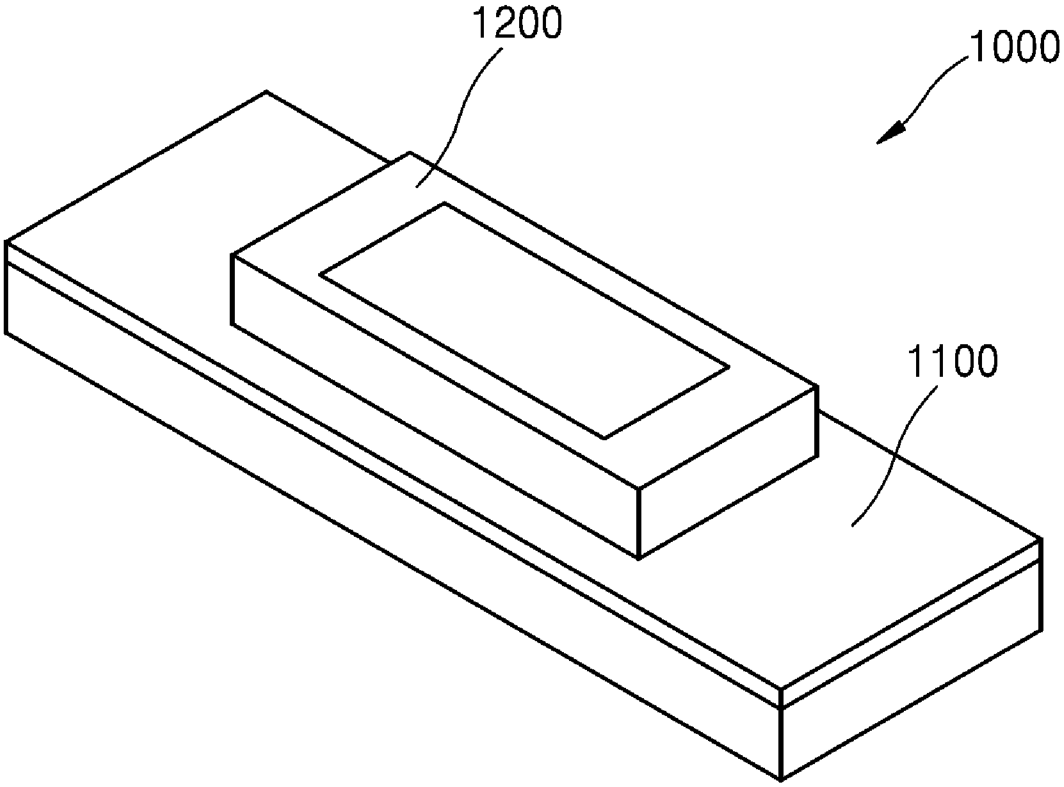
FIG. 1 is a perspective view illustrating a cap plate assembly according to an embodiment of the present disclosure.

Hereinafter, exemplary embodiments of the present disclosure will be described in detail with reference to the accompanying drawings.

Embodiments of the present disclosure are provided to more completely explain the present disclosure to those skilled in the art. The following embodiments may be modified in various forms, and the scope of the present disclosure is not limited to the following embodiments. The embodiments are provided to make the present disclosure more thorough and complete, and to completely convey the spirit of the present disclosure to those skilled in the art. In addition, a thickness or size of each layer illustrated in the drawings is exaggerated for the purpose of clarity and for convenience of description.

Hereinafter, the embodiments of the present disclosure will be described with reference to the drawings that schematically illustrate ideal embodiments of the present disclosure. In the drawings, for example, depending on manufacturing techniques and/or tolerance, variations of the illustrated shape may be expected. Therefore, it should be interpreted that the embodiments based on the spirit of the present disclosure are not limited to particular shapes of regions illustrated in the present specification but include changes in shapes made during a manufacturing procedure, for example.

Figure 2:
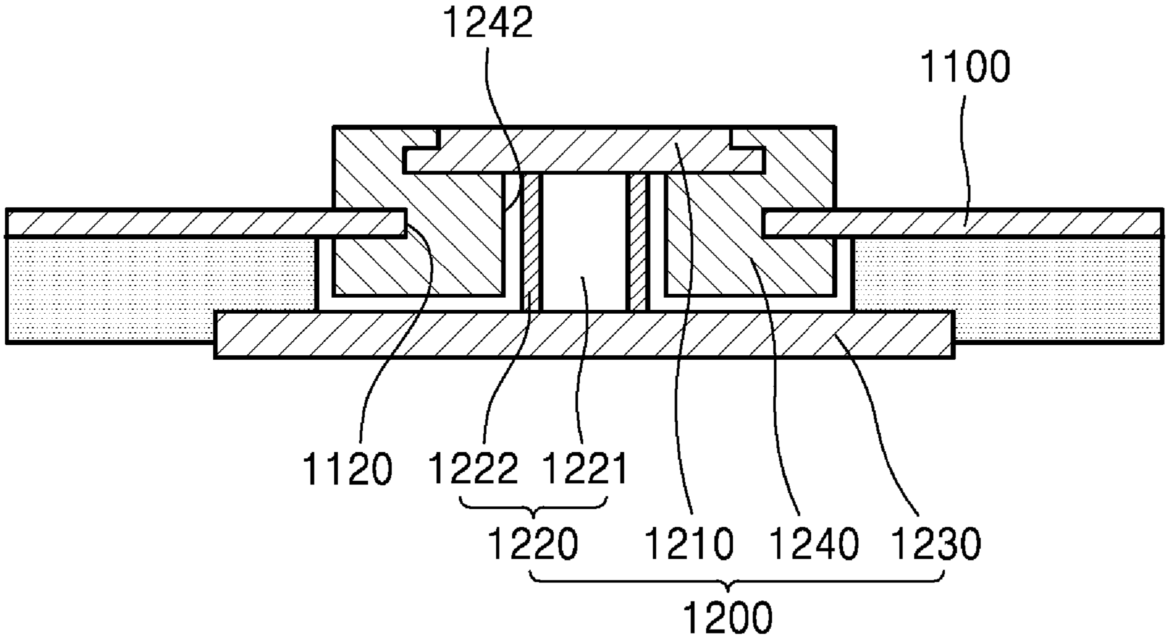
FIG. 2 is a cross-sectional view illustrating the cap plate assembly according to the embodiment of the present disclosure.
Figure 3:
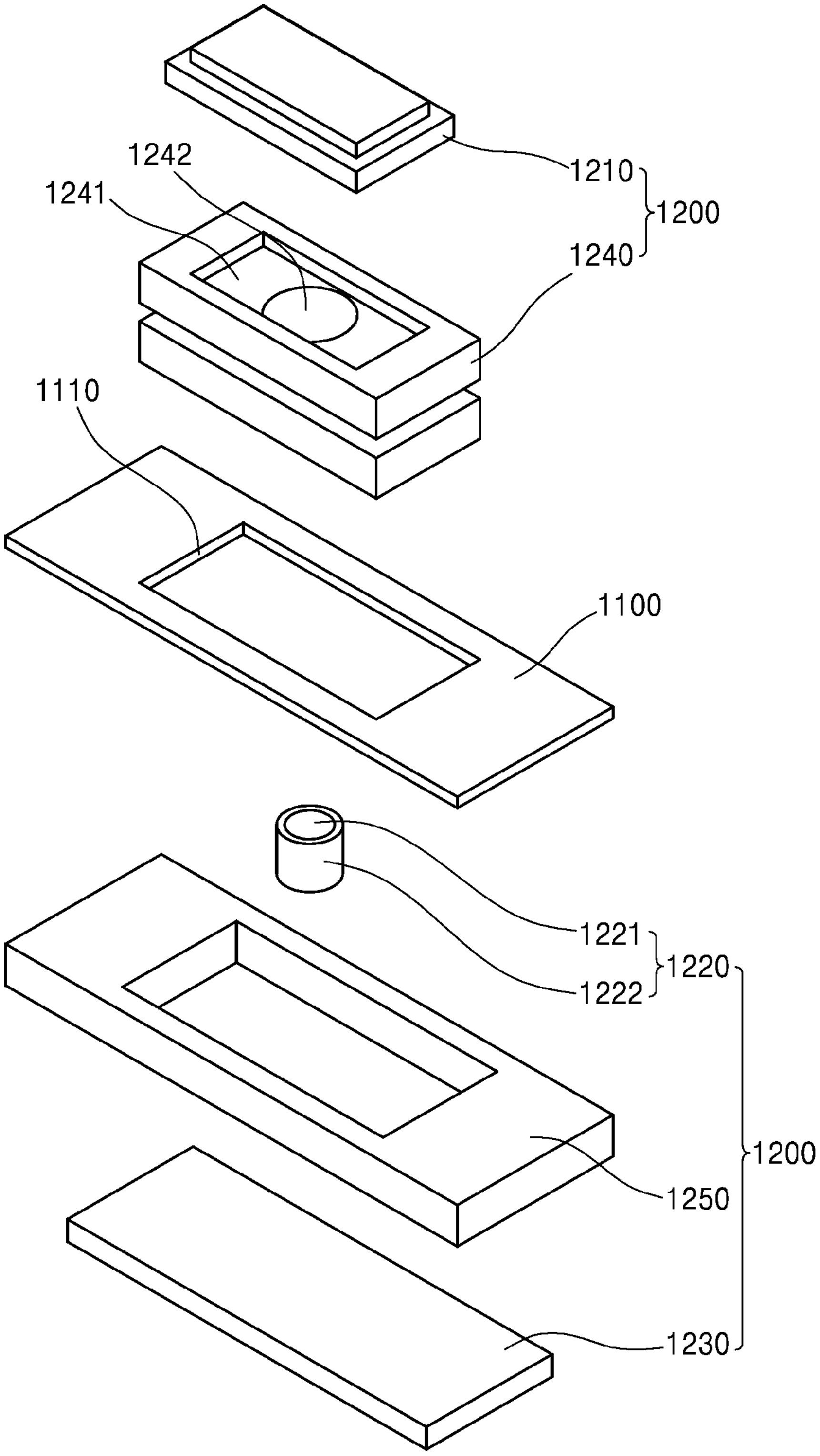
FIG. 3 is an exploded perspective view illustrating the cap plate assembly according to the embodiment of the present disclosure.
Figure 4:
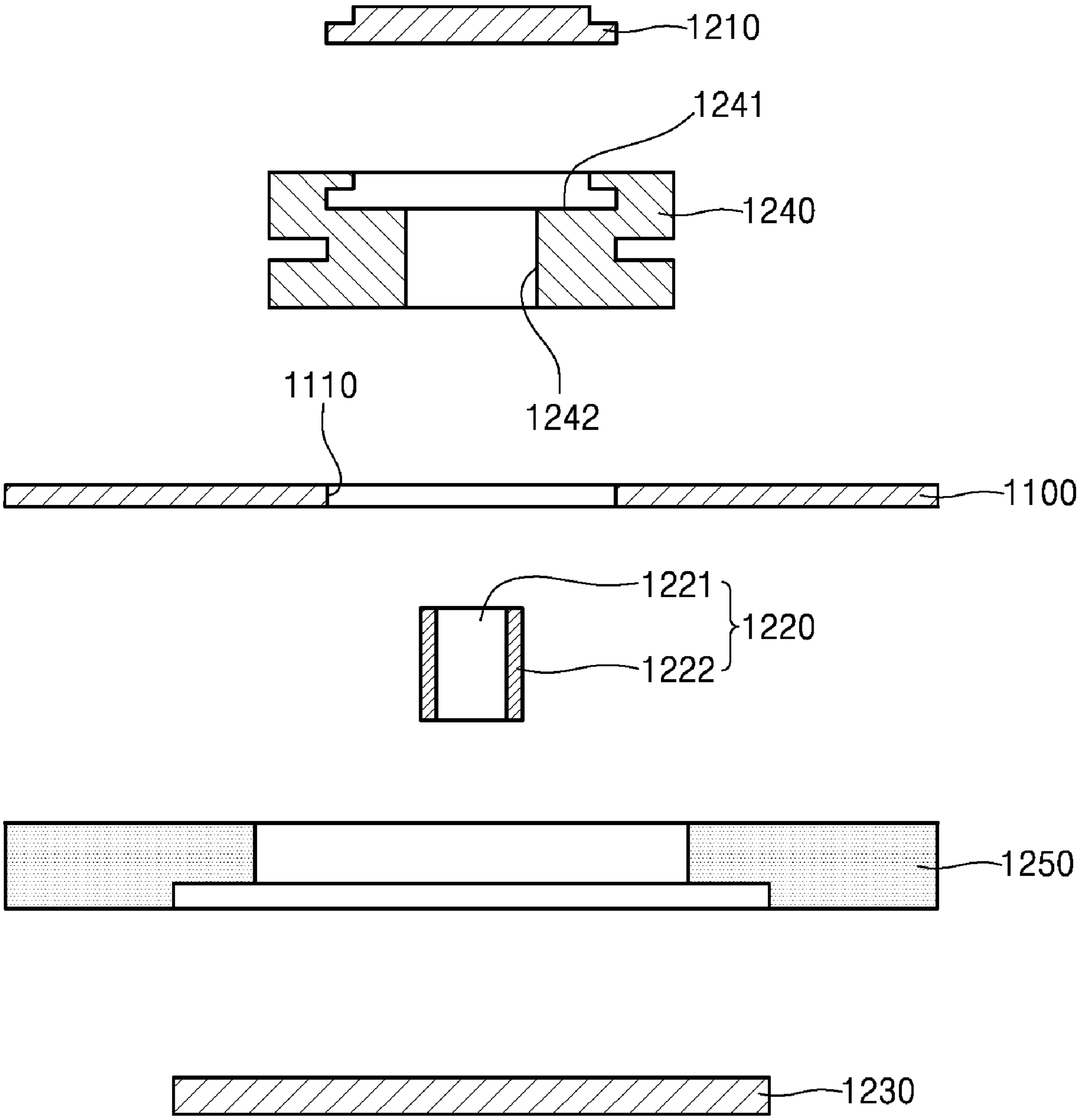
FIG. 4 is a cross-sectional view illustrating a structure in which the cap plate assembly according to the embodiment of the present disclosure is disassembled.

FIG. 1 is a perspective view illustrating a cap plate assembly according to an embodiment of the present disclosure, FIG. 2 is a cross-sectional view illustrating the cap plate assembly in FIG. 1, FIG. 3 is an exploded perspective view illustrating the cap plate assembly in FIG. 1, and FIG. 4 is a cross-sectional view illustrating a structure in which the cap plate assembly in FIG. 1 is disassembled.

First, as illustrated in FIG. 1, a cap plate assembly according to an embodiment of the present disclosure may broadly include a cap plate 1100 and a first electrode part 1200.

The cap plate 1100 may be formed to cover an upper side of a housing 3000 (see FIG. 7) and have a first accommodation hole 1110 formed through at least a part of the cap plate 1100 so that the inside and outside of the housing 3000 communicate with each other.

The cap plate 1100 may be installed in an opening of the housing of the battery cell and seal the housing. For example, the housing and the cap plate 1100 may be made of a first material and welded to each other, and the first material may include aluminum, an aluminum alloy, or the like.

In addition, the cap plate 1100 may include an electrolyte injection port, a vent hole, a terminal hole, and the like. The electrolyte injection port (not illustrated) is an injection port through which an electrolyte may be injected into the housing after the cap plate 1100 is coupled to the housing. The electrolyte injection port may be sealed by a sealing closure (not illustrated) after the electrolyte is injected.

As illustrated in FIGS. 2 to 4, the cap plate 1100 may have the first accommodation hole 1110 formed vertically through at least a part of the cap plate 1100.

Specifically, the first accommodation hole 1110 is a hole portion formed through the cap plate 1100 to connect upper and lower sides of the cap plate 1100. A peripheral portion of the first accommodation hole 1110 and an inner surface of the first accommodation hole 1110 may be surrounded by a first insulation part 1240 to be described below.

In addition, the cap plate 1100 may have first support holes 1120 formed vertically through at least a part of the cap plate 1100.

As illustrated in FIG. 3, the first support hole 1120 is a hole portion formed through the cap plate 1100 to connect the upper and lower sides of the cap plate 1100. The first support hole 1120 may be formed at a periphery of the first accommodation hole 1110. Particularly, the first support holes 1120 may be formed at two opposite sides of the first accommodation hole 1110 and filled with the first insulation part 1240.

The first electrode part 1200 may be coupled to a first through-hole 1242 from above and below the cap plate 1100.

Specifically, the first electrode part 1200 may include a first terminal plate 1210, the first insulation part 1240, a first electrode terminal 1220, and a first sub-plate 1230.

As illustrated in FIGS. 2 to 4, the first terminal plate 1210 may be seated and installed on an upper portion of the cap plate 1100 and connected to a busbar at a position disposed outside the housing.

An upper surface of the first terminal plate 1210 may be formed in a shape corresponding to a shape of the busbar so that the first terminal plate 1210 is coupled to the busbar. The first terminal plate 1210 may be subjected to a surface treatment to improve current application efficiency when the first terminal plate 1210 is in contact with the busbar.

A protruding portion may be formed on a lateral surface of the first terminal plate 1210. The protruding portion may be formed along a periphery of the first terminal plate 1210, and a stepped portion having a lower portion further protruding than an upper portion thereof from the lateral surface of the first terminal plate 1210 may be formed.

The first terminal plate 1210 may be made of the first material, and the first material may include aluminum, an aluminum alloy, or the like.

As illustrated in FIGS. 2 to 4, a first terminal seating portion 1241, on which the first terminal plate 1210 is seated, may be formed on an upper portion of the first insulation part 1240.

The first terminal plate 1210 may be installed on the first terminal seating portion 1241, and the first insulation part 1240 may have a fixing groove portion into which the protruding portion is inserted so that the first terminal plate 1210 may be fixed to the first insulation part 1240.

The fixing groove portion may have a shape corresponding to the protruding portion and be formed at a position on the first insulation part 1240 that corresponds to the periphery of the first terminal plate 1210.

At least a part of the first insulation part 1240 may be formed on the upper portion of the cap plate 1100, and the first terminal seating portion 1241 is formed in a surface of the first insulation part 1240 opposite to the surface that adjoins the cap plate 1100, such that the first terminal plate 1210 and the cap plate 1100 are spaced apart from each other.

The first insulation part 1240 may have the first through-hole 1242 formed in the first accommodation hole 1110. Specifically, at least a part of the first insulation part 1240 may be formed inside the first accommodation hole 1110 so that the inner surface of the first accommodation hole 1110 may be blocked from the outside.

In this case, the first accommodation hole 1110 is not filled with the first insulation part 1240. The first through-hole 1242, which is smaller than the first accommodation hole 1110, may be formed in the first accommodation hole 1110, and at least a part of the first electrode part 1200 may be inserted through the first through-hole 1242.

The first accommodation hole 1110 may be penetratively formed as a hole portion having various shapes such as a circular shape, an elliptical shape, or a quadrangular shape.

The first insulation part 1240 may be formed to surround the first accommodation hole 1110 of the cap plate 1100 and fix the first terminal plate 1210.

Specifically, the first insulation part 1240 may be formed together with the cap plate 1100 and the first terminal plate 1210 by insert-injection molding.

That is, the first insulation part 1240 may be formed by injecting a molten material to the periphery of the first accommodation hole 1110 of the cap plate 1100 and between the cap plate 1100 and the first terminal plate 1210 in a mold in which the cap plate 1100 and the first terminal plate 1210 are fixed.

The first insulation part 1240 is formed between the cap plate 1100 and the first terminal plate 1210 by insert-injection molding, such that the cap plate 1100, the first insulation part 1240, and the first terminal plate 1210 may be easily coupled without separate assembling processes.

The first terminal plate 1210 and the first insulation part 1240 may be easily fixed, and a portion between the first terminal plate 1210 and the first insulation part 1240 may be sealed without a seal such as a gasket.

As illustrated in FIGS. 2 to 4, the first sub-plate 1230 may be connected to a lower portion of the first electrode terminal 1220 so as to apply current to the first electrode terminal 1220. For example, the first sub-plate 1230 is formed in a flat plate shape, one surface of the first sub-plate 1230 is joined to the first electrode terminal 1220, and the other surface of the first sub-plate 1230 is joined to a tab part in the housing, such that the current may be applied to the first electrode terminal 1220 from the tab part.

The first sub-plate 1230 may be made of a second material.

The first electrode terminal 1220 may be inserted and coupled into the first through-hole 1242 so that the current is applied to the first terminal plate 1210 from the first sub-plate 1230 formed in the housing 3000.

As illustrated in FIGS. 2 to 4, the first electrode terminal 1220 may be formed by stacking the first material and the second material, which is different from the first material, in a width or length direction of the cap plate 1100.

Specifically, the first electrode terminal 1220 may include a core portion 1221 and a clad portion 1222.

The core portion 1221 may be formed in various shapes such as a circular shape, an elliptical shape, and a quadrangular shape.

The core portion 1221 may be made of the first material, and the first material may include aluminum, an aluminum alloy, and the like.

The clad portion 1222 may be formed to surround an outer surface of the core portion 1221. For example, the clad portion 1222 may be formed to surround the core portion 1221 in a direction perpendicular to an axial direction of the core portion 1221.

The clad portion 1222 may be made of the second material, and the second material may include copper, a copper alloy, nickel, a nickel alloy, and the like.

The clad portion 1222 and the core portion 1221 are configured as a stack including different types of materials coupled to one another when mutual structures of the contact surfaces of the clad portion 1222 and the core portion 1221 are destroyed, coupled, and stabilized because of intense heat and pressure.

Because the clad portion 1222 is formed on the outer surface of the core portion 1221, the core portion 1221 may be protected from corrosion and damage even though the electrolyte accommodated in the housing is introduced into the first electrode terminal 1220.

An upper surface of the first electrode terminal 1220 may be joined to the first terminal plate 1210, and a lower surface of the first electrode terminal 1220 may be joined to the first sub-plate 1230.

As described above, the first terminal plate 1210 may be made of the first material, and the first sub-plate 1230 may be made of the second material different from the first material.

In order to apply the current to the first terminal plate 1210 and the first sub-plate 1230 made of different materials, the first electrode terminal 1220, which is formed by stacking the first material and the second material, may be installed between the first terminal plate 1210 and the first sub-plate 1230, such that the identical materials may be joined to one another.

Specifically, an upper surface of the core portion 1221 of the first electrode terminal 1220 may be joined to the first terminal plate 1210. For example, the first terminal plate 1210 and the core portion 1221 may be joined to each other by welding, particularly laser welding at a position above the first terminal plate 1210.

A lower surface of the clad portion 1222 of the first electrode terminal 1220 may be joined to the first sub-plate 1230. For example, the clad portion 1222 and the first sub-plate 1230 may be joined to each other by direct bonding on the lower surface of the clad portion 1222. In addition, the clad portion 1222 and the first sub-plate 1230 may be joined by various methods such as physical/chemical junction, welding, or the like.

That is, the core portion 1221 of the first electrode terminal 1220 and the first terminal plate 1210 are joined, and the clad portion 1222 of the first electrode terminal 1220 and the first sub-plate 1230 are joined, such that the components made of the materials having the same main component may be joined, which may reduce resistance from the inside of the housing to the busbar and improve the efficiency in transmitting electric power.

Figure 5:
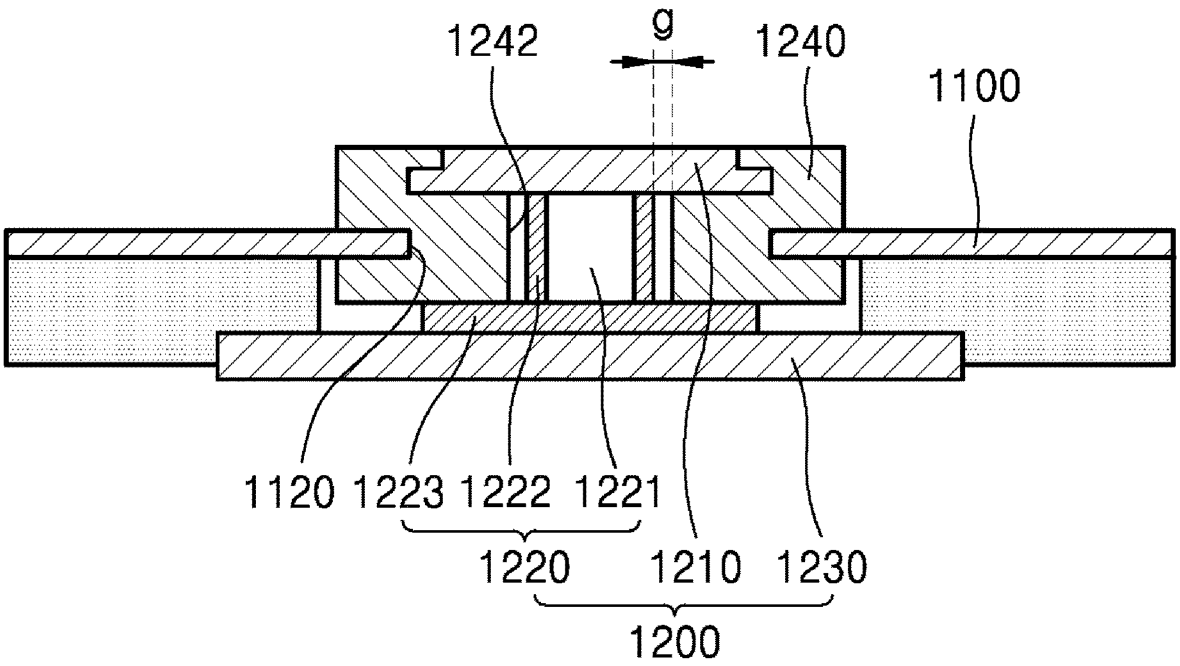
FIG. 5 is a cross-sectional view illustrating a cap plate assembly according to another embodiment of the present disclosure.
Figure 6:
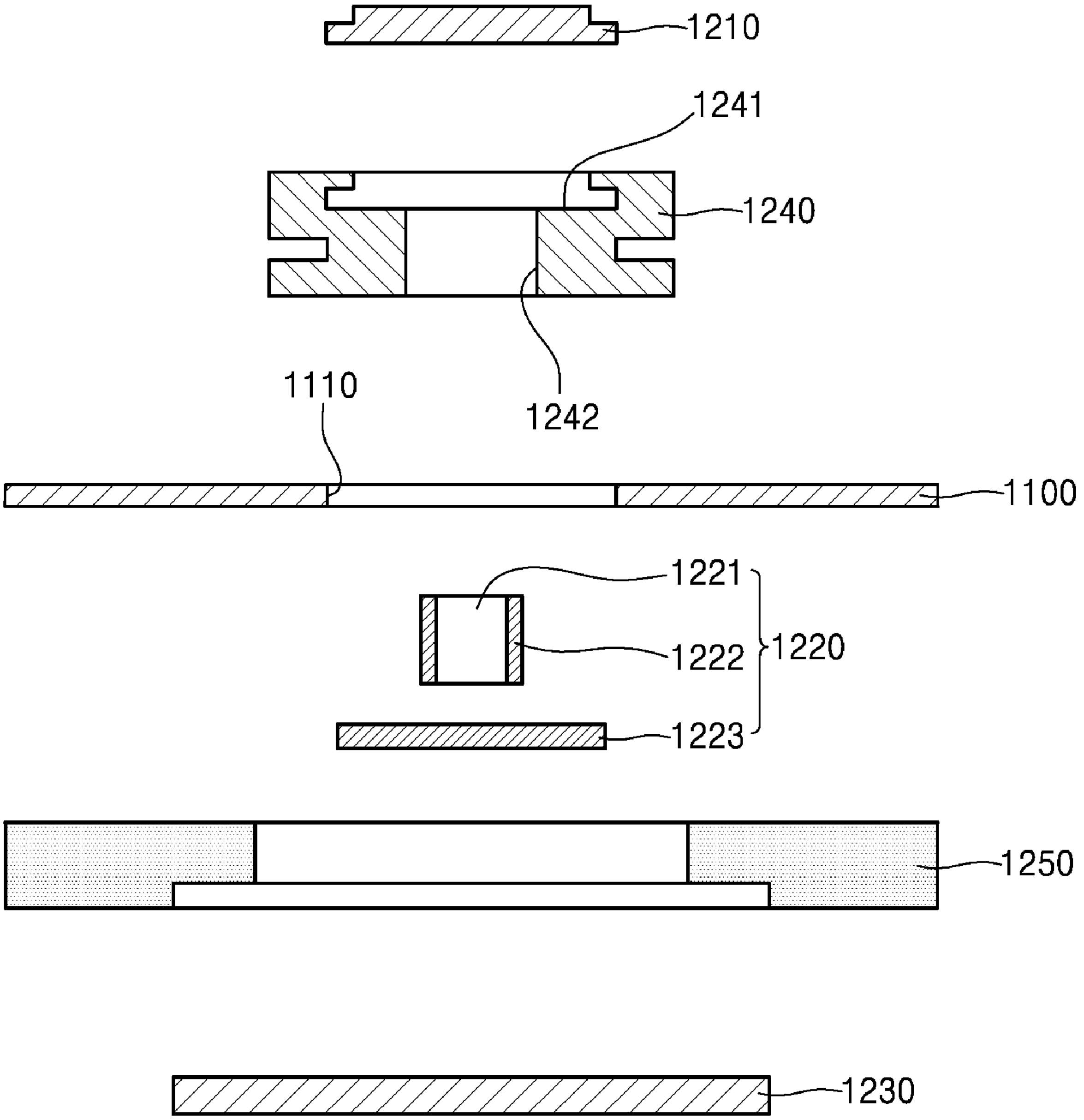
FIG. 6 is a cross-sectional view illustrating a structure in which the cap plate assembly in FIG. 5 is disassembled.

FIG. 5 is a cross-sectional view illustrating a cap plate assembly according to another embodiment of the present disclosure, and FIG. 6 is a cross-sectional view illustrating a structure in which the cap plate assembly in FIG. 5 is disassembled.

As illustrated in FIGS. 5 and 6, the first electrode terminal 1220 may include the core portion 1221, the clad portion 1222, and a base portion 1223.

The core portion 1221 and the clad portion 1222 may be formed as components identical to the above-mentioned components.

The base portion 1223 is a flat plate-shaped structure joined to a lower portion of the core portion 1221 and a lower portion of the clad portion 1222. The base portion 1223 may have a larger area than the core portion 1221 and the clad portion 1222, such that the core portion 1221 and the clad portion 1222 may be joined to one surface of the base portion 1223, and the first sub-plate 1230 may be joined to the other surface of the base portion 1223.

The base portion 1223 may be made of the second material.

The base portion 1223 and the clad portion 1222 may be joined as at least a part of a periphery of the clad portion 1222 is welded to an upper portion of the base portion 1223.

Specifically, the upper surface of the base portion 1223 and a periphery of a lateral surface of the clad portion 1222 may be welded and joined. Therefore, the base portion 1223 having a larger area may improve transmission efficiency and be easily coupled to the first sub-plate 1230.

The cap plate assembly according to some embodiments of the present disclosure may further include a third insulation part 1250.

The third insulation part 1250 may be formed to be coupled to a lower portion of the cap plate 1100 to support the first sub-plate 1230.

As illustrated in FIGS. 2 to 4, the third insulation part 1250 may have a flat plate shape, and an opening portion may be formed vertically through at least a part of the third insulation part 1250.

An upper surface of the third insulation part 1250 may be coupled to and installed on a lower surface of the cap plate 1100, and a lower surface of the third insulation part 1250 may be coupled to an upper surface of the first sub-plate 1230. In this case, the first electrode terminal 1220 joined to the first sub-plate 1230 may be inserted through the opening portion.

The third insulation part 1250 may be formed between the first sub-plate 1230 and the cap plate 1100 and space the first sub-plate 1230 from the cap plate 1100.

Figure 9:
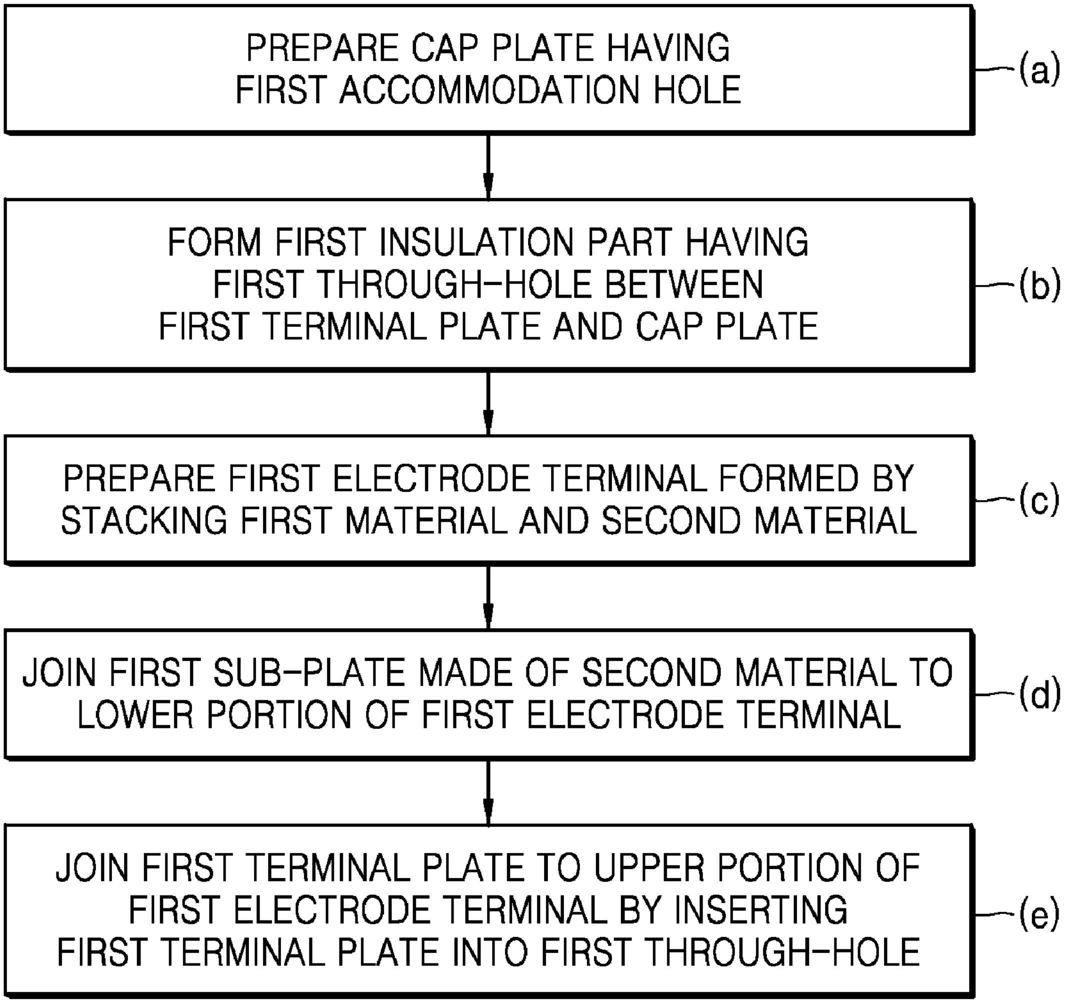
FIG. 9 is a view illustrating a method of manufacturing a cap plate assembly according to the embodiment of the present disclosure.
Figure 10:
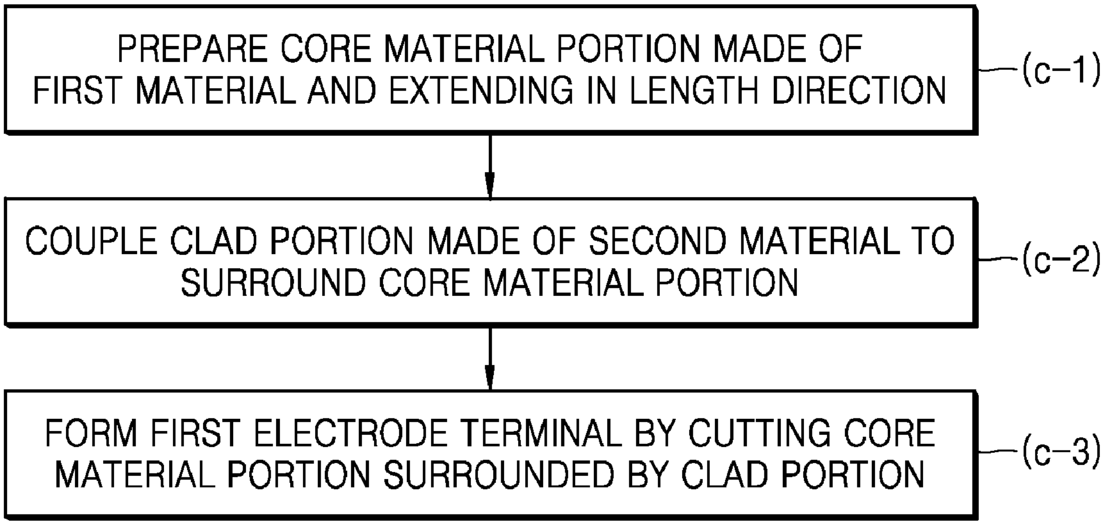
FIGS. 10 to 12 are views illustrating various embodiments of a step of preparing a first electrode terminal in step (c) in FIG. 9.

FIG. 9 is a view illustrating a method of manufacturing a cap plate assembly according to the embodiment of the present disclosure, and FIG. 10 is a view illustrating a step of preparing the first electrode terminal in step (c) in FIG. 9.

As illustrated in FIG. 9, the method of manufacturing a cap plate assembly according to the embodiment of the present disclosure may include (a) preparing the cap plate 1100 having the first accommodation hole 1110. (b) forming the first insulation part 1240 having the first through-hole 1242 between the first terminal plate 1210 and the cap plate 1100, (c) preparing the first electrode terminal 1220 formed by stacking the first material and the second material, (d) joining the first sub-plate 1230 made of the second material to the lower portion of the first electrode terminal 1220, and (e) joining the first terminal plate 1230 to the upper portion of the first electrode terminal 1220 by inserting the first terminal plate into the first through-hole 1242.

Specifically, step (a) is a step of preparing the cap plate 1100 formed to cover the upper side of the housing 3000 and having the first accommodation hole 1110 formed through at least a part of the cap plate 1100 so that the inside and outside of the housing 3000 communicate with each other.

In step (a), the first accommodation hole 1110 may be formed through the cap plate 1100 so that the upper and lower sides of the cap plate 1100 are connected.

In step (a), the first support hole 1120 may be formed vertically through at least a part of the cap plate 1100.

In step (a), an electrolyte injection port, a vent hole, a terminal hole, and the like may be formed in the cap plate 1100, and the sealing closure (not illustrated), which seals the electrolyte injection port after the electrolyte is injected, may be prepared.

As illustrated in FIG. 9, step (b) is a step of installing the first terminal plate 1210, which is made of the first material and seated and installed on the upper portion of the cap plate 1100 so as to be connected to the busbar at the position disposed outside the housing 3000, on the upper portion of the cap plate 1100, spacing the first terminal plate 1210 and the cap plate 1100, and forming the first insulation part 1240 having the first through-hole 1242 formed vertically through the first insulation part 1240.

Figure 14:
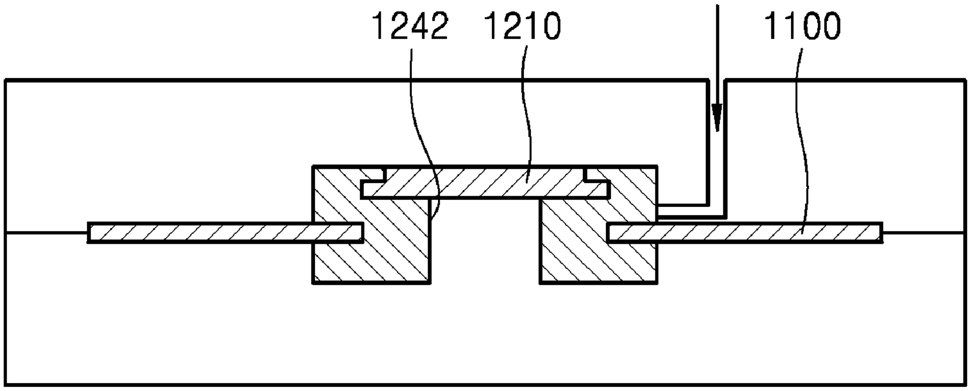
FIG. 14 is a perspective view illustrating a step of forming a first insulation part in step (b).

Specifically, in step (b), the first insulation part 1240 may be formed by performing insert-injection molding on the cap plate 1100 and the first terminal plate 1210 so that the first insulation part 1240 is formed between the cap plate 1100 and the first terminal plate 1210. FIG. 14 is a perspective view illustrating a step of forming the first insulation part in step (b).

As illustrated in FIG. 14, the first insulation part 1240 may be formed by injecting a molten material to the periphery of the first accommodation hole 1110 of the cap plate 1100 and between the cap plate 1100 and the first terminal plate 1210 in the mold in which the cap plate 1100 and the first terminal plate 1210 are fixed.

In step (b), the first insulation part 1240, which includes the fixing groove portion having the shape surrounding the protruding portion formed along the periphery of the first terminal plate 1210, may be formed so that the first terminal plate 1210 may be fixed to the first insulation part 1240.

In step (b), at least a part of the first insulation part 1240 may be formed inside the first accommodation hole 1110 so that the inner surface of the first accommodation hole 1110 is blocked from the outside.

As illustrated in FIG. 9, step (c) is a step of preparing the first electrode terminal 1220 formed by stacking the first material and the second material, which is different from the first material, in the width or length direction of the cap plate 1100.

Specifically, as illustrated in FIG. 10, step (c) may include (c-1) preparing a core material portion 1221-1, (c-2) coupling the clad portion 1222 to a periphery of the core material portion 1221-1, and (c-3) forming the first electrode terminal 1220.

Figure 15:
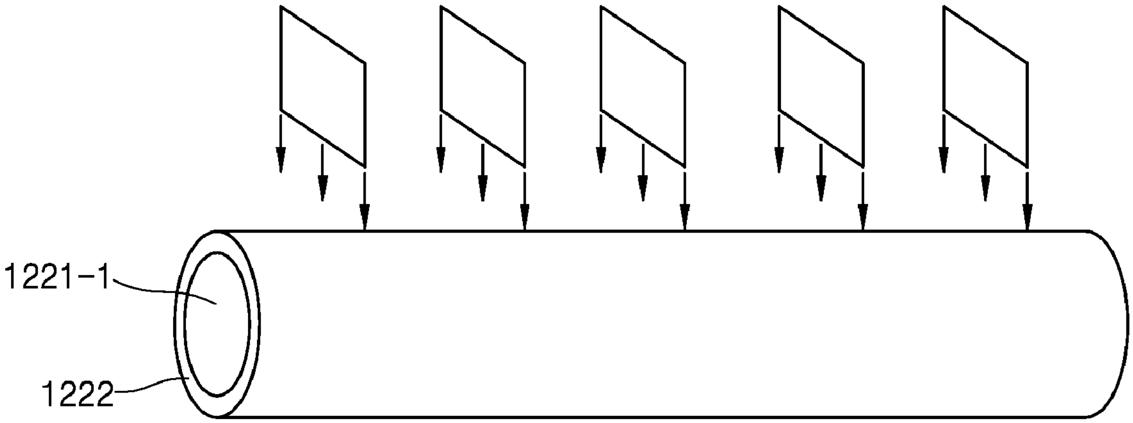
FIGS. 15 to 17 are views illustrating various embodiments for forming the first electrode terminal in step (c).
Figure 16:
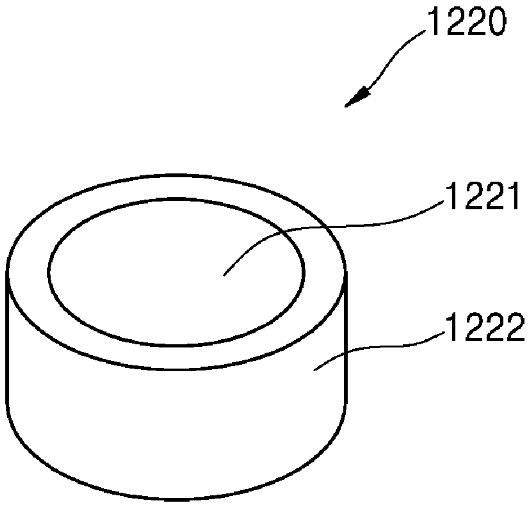

FIGS. 15 and 16 are views illustrating a process in which the first electrode terminal 1220 is formed in step (c-1), step (c-2), and step (c-3).

In step (c-1), the core material portion 1221-1 made of the first material so as to be joined to the first terminal plate 1210 and extending by a predetermined length in the length direction may be prepared.

The core material portion 1221-1 may be made of aluminum, an aluminum alloy, or the like that is the first material. In this case, the core material portion 1221-1 is illustrated as having a circular shape in FIG. 15. However, the core material portion 1221-1 may have various shapes such as an elliptical shape or a quadrangular shape in addition to a circular shape.

Step (c-2) is a step of coupling the clad portion 1222 to surround the periphery of the core material portion 1221-1 with the clad portion 1222 made of the second material so as to be joined to the first sub-plate 1230.

Specifically, step (c-2) is a step of surrounding the core portion 1221 in the direction perpendicular to the axial direction of the core portion 1221 with the clad portion 1222, and coupling the contact surfaces of the clad portion 1222 and the core portion 1221 by destroying, coupling, and stabilizing the mutual structures of the contact surfaces of the clad portion 1222 and the core portion 1221.

As illustrated in FIG. 15, step (c-3) is a step of forming the first electrode terminal 1220 by cutting, in the direction perpendicular to the length direction, the core material portion 1221-1 surrounded by the clad portion 1222.

Therefore, as illustrated in FIG. 16, the first electrode terminal 1220 may be formed to have the upper and lower surfaces that are surfaces cut in the length direction.

As illustrated in FIG. 9, step (d) is a step of joining the first sub-plate 1230, which is made of the second material so as to apply the current to the first electrode terminal 1220, to the lower portion of the first electrode terminal 1220.

Figure 18:
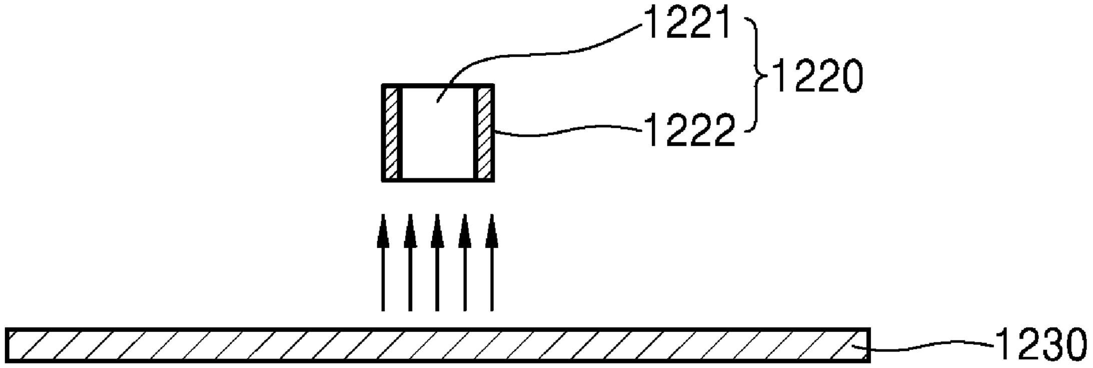
FIGS. 18 and 19 are views illustrating a process in which a first sub-plate and the first electrode terminal are joined in step (d).

FIG. 18 is a view illustrating a process in which the first sub-plate 1230 and the first electrode terminal 1220 are joined in step (d).

As illustrated in FIG. 18, in step (d), the first electrode terminal 1220 may be joined to the upper surface of the first sub-plate 1230, for example, by direct bonding.

In step (d), the first sub-plate 1230 is joined to the first electrode terminal 1220, such that the current is applied to both the core portion 1221 and the clad portion 1222 from the first sub-plate 1230. In this case, a resistance value is low on a junction surface with the clad portion 1222 made of the material containing the same main component as the material of the first sub-plate 1230, such that the current application may be further facilitated.

The clad portion 1222 and the first sub-plate 1230 may be made of the materials having the same main component and joined by various methods such as physical/chemical junction or welding.

As illustrated in FIG. 9, step (e) is a step of joining the first terminal plate 1210 to the upper portion of the first electrode terminal 1220.

Figure 20:
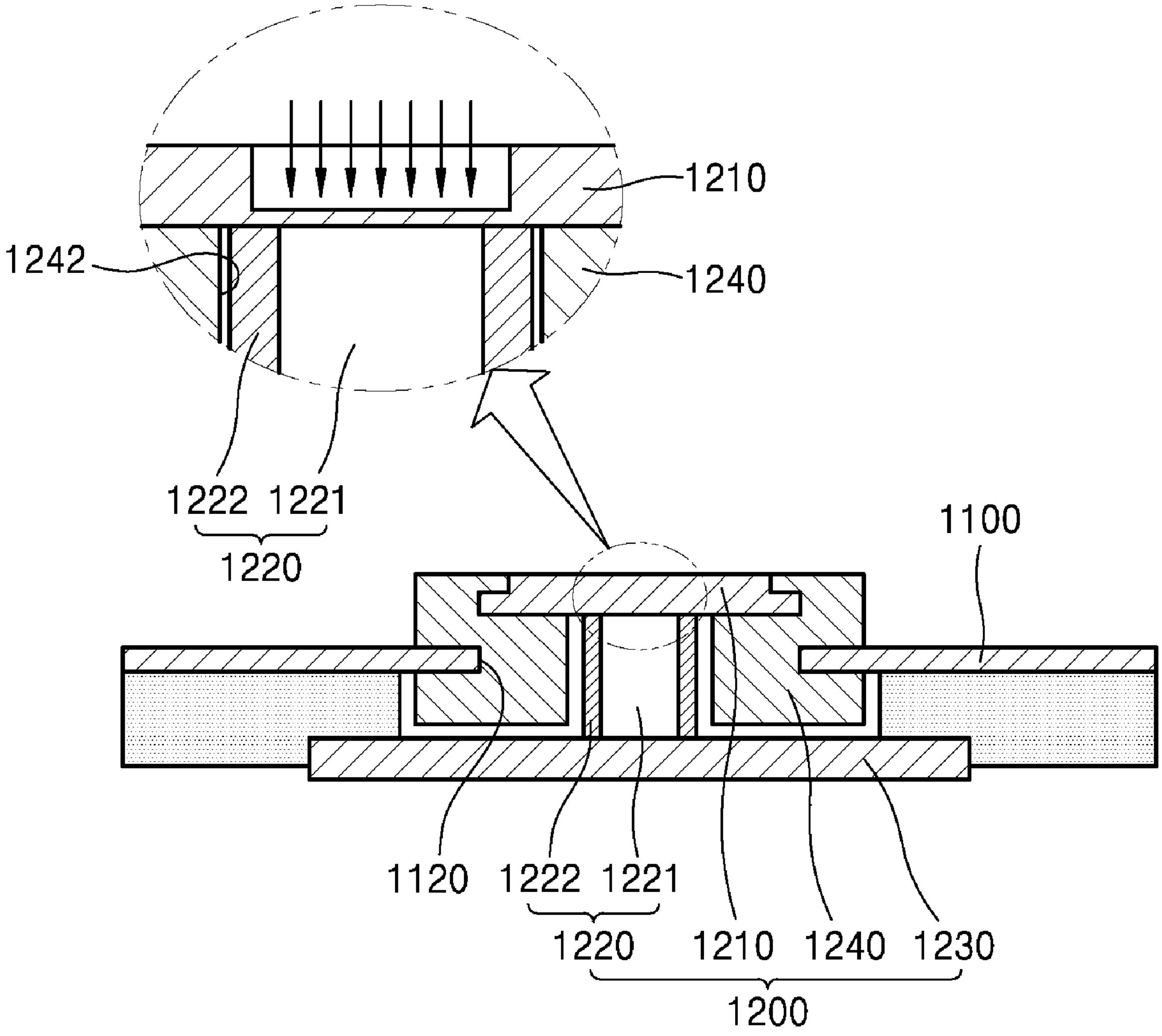
FIG. 20 is a view illustrating a process in which the first electrode terminal and a first terminal plate are joined in step (e).

FIG. 20 is a view illustrating a process in which the first electrode terminal and the first terminal plate are joined in step (e).

As illustrated in FIG. 20, in step (e), the first electrode terminal 1220 may be inserted into the first through-hole 1242, and the first terminal plate 1210 may be joined to the upper portion of the first electrode terminal 1220, such that the first terminal plate 1210 applies the current from an electrode assembly 2000 in the housing 3000.

In step (e), the first electrode terminal may be joined to a region of the upper portion of the first terminal plate 1210, in which the core portion 1221 is formed, by welding, particularly, laser welding. In this case, the first terminal plate 1210 and the core portion 1221 may be made of the materials having the same main component and be easily coupled.

Figure 13:
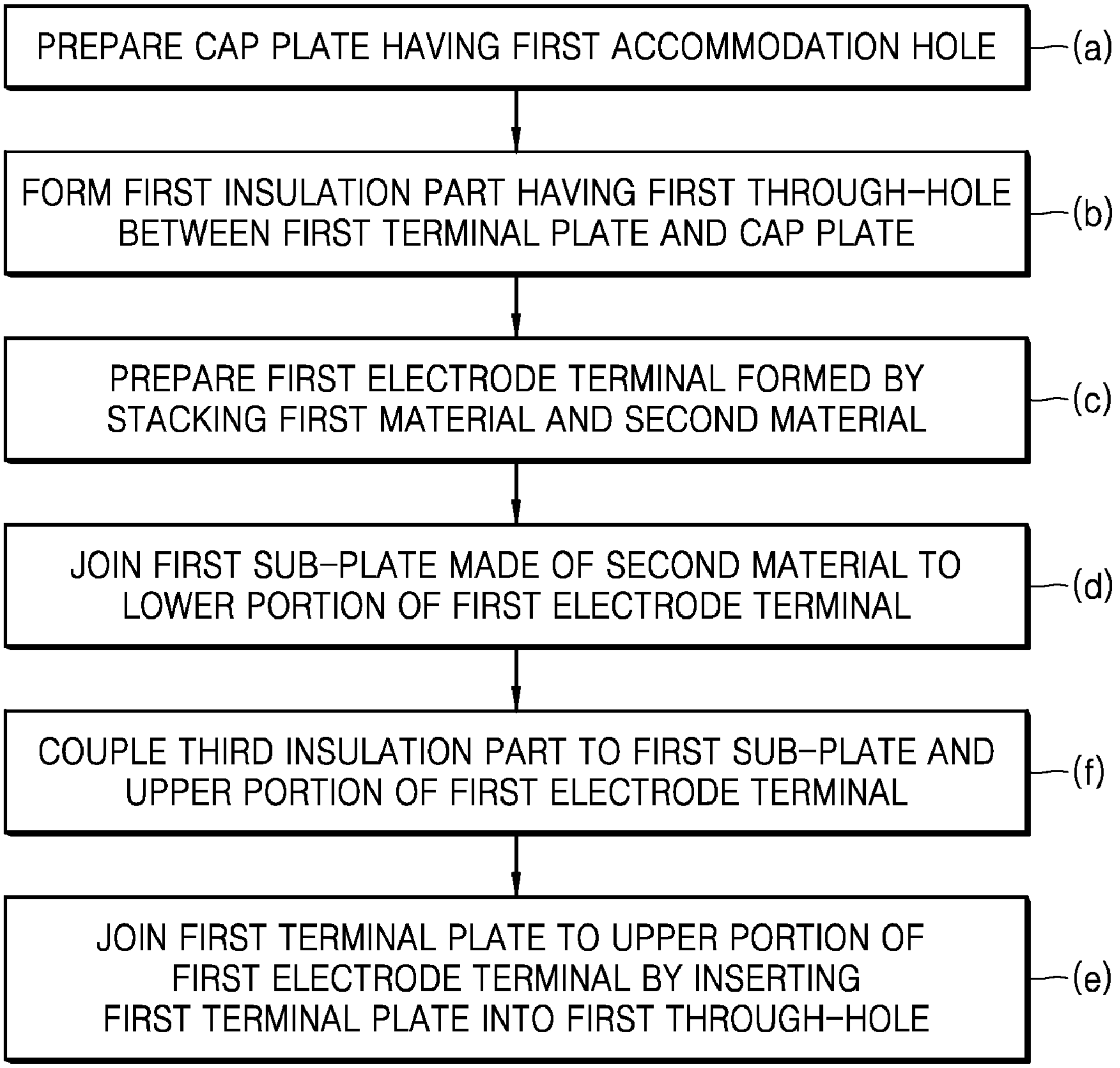
FIG. 13 is a view illustrating a method of manufacturing a cap plate assembly according to another embodiment of the present disclosure.
Figure 21:
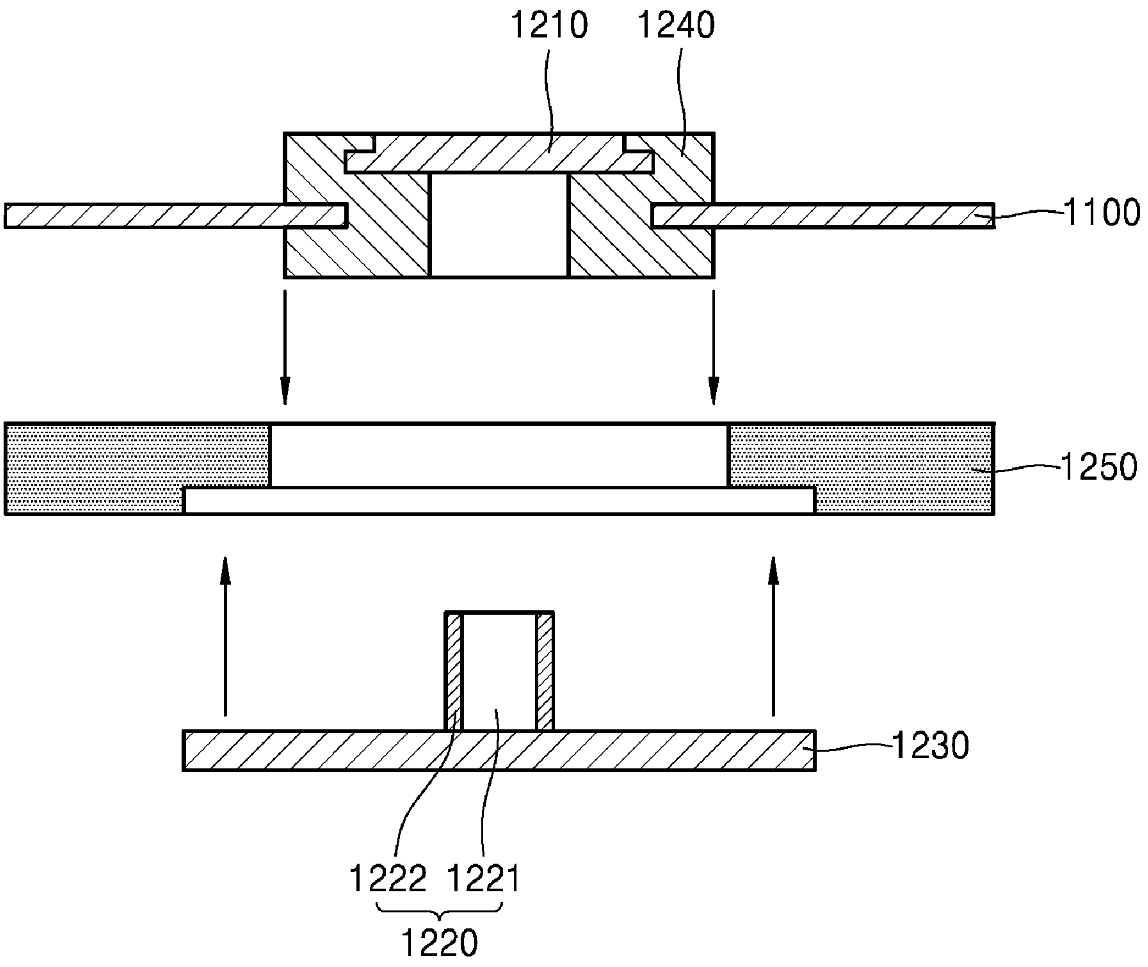
FIG. 21 is a view illustrating a process in which a third insulation part is coupled in step (f).

FIG. 13 is a view illustrating a method of manufacturing a cap plate assembly according to another embodiment of the present disclosure, and FIG. 21 is a view illustrating a process in which the third insulation part is coupled in step (f).

As illustrated in FIG. 13, a method of manufacturing a cap plate assembly according to still another embodiment of the present disclosure may include (f) coupling the third insulation part 1250 prior to step (e).

As illustrated in FIG. 21, step (f) is a step of supporting and coupling the first sub-plate 1230 on the upper portion of the first sub-plate 1230 with the third insulation part 1250.

Specifically, in step (f), the cap plate 1100 is coupled and installed onto the upper surface of the third insulation part 1250, and the first sub-plate 1230 may be coupled to the lower surface of the third insulation part 1250. In this case, the first electrode terminal 1220 joined to the first sub-plate 1230 may be inserted through the opening portion formed through at least a part of the third insulation part 1250.

That is, step (f) is a step of coupling the third insulation part 1250 between the first sub-plate 1230 and the cap plate 1100, spacing the first sub-plate 1230 from the cap plate 1100, and fixing the first sub-plate 1230 to the third insulation part 1250.

Figure 11:
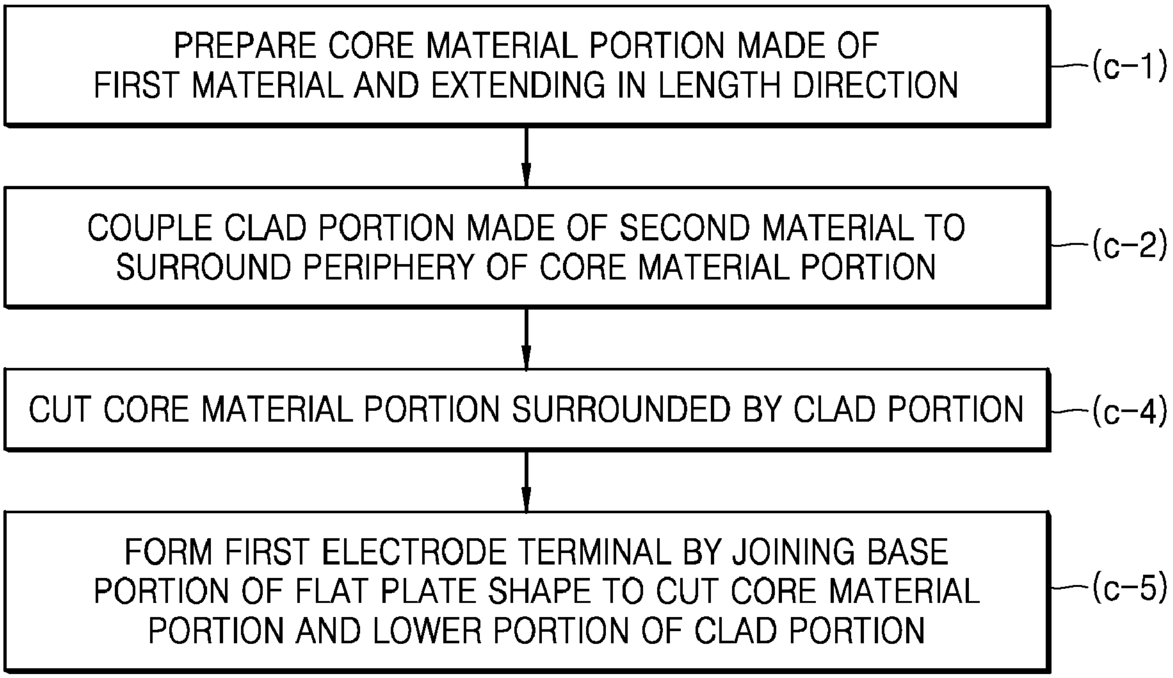
Figure 12:
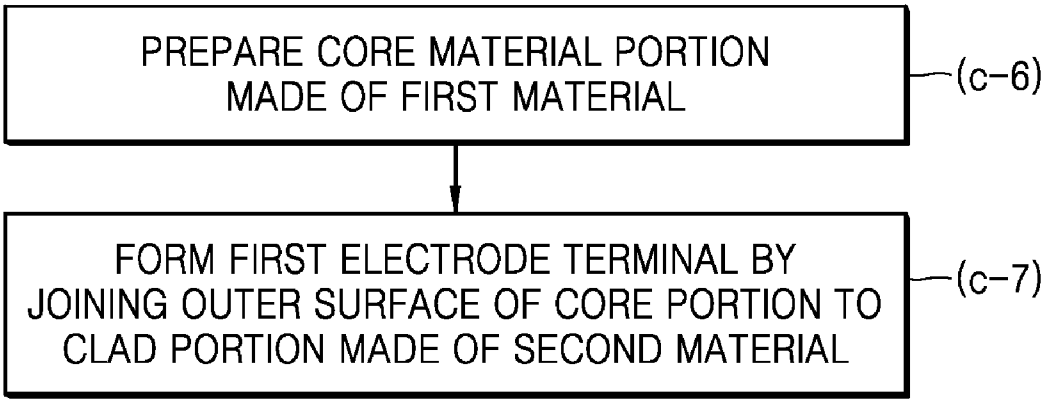
Figure 17:
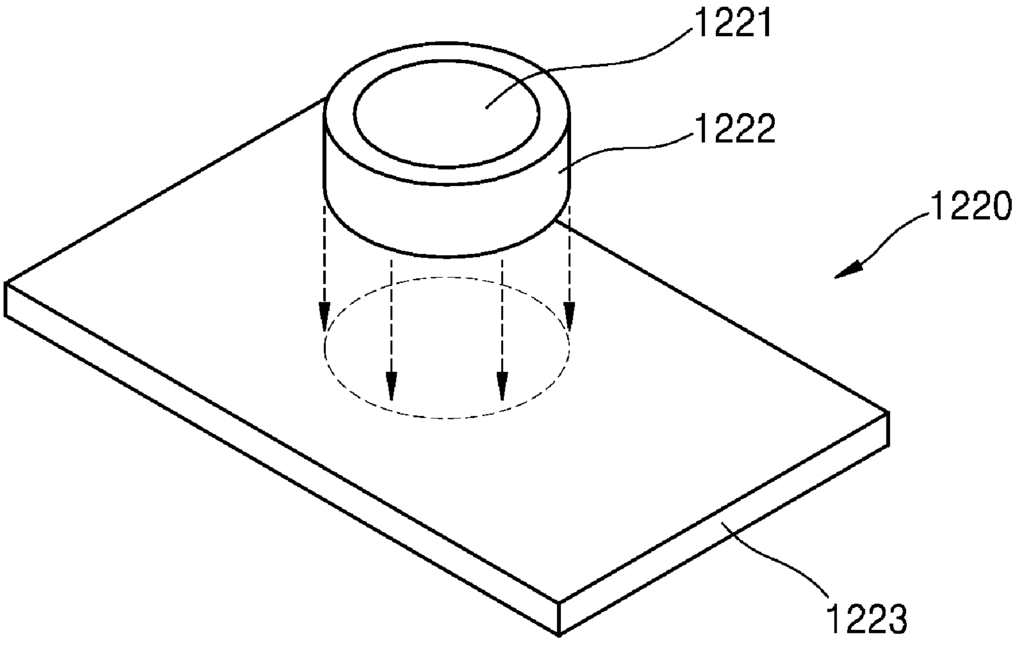
Figure 19:
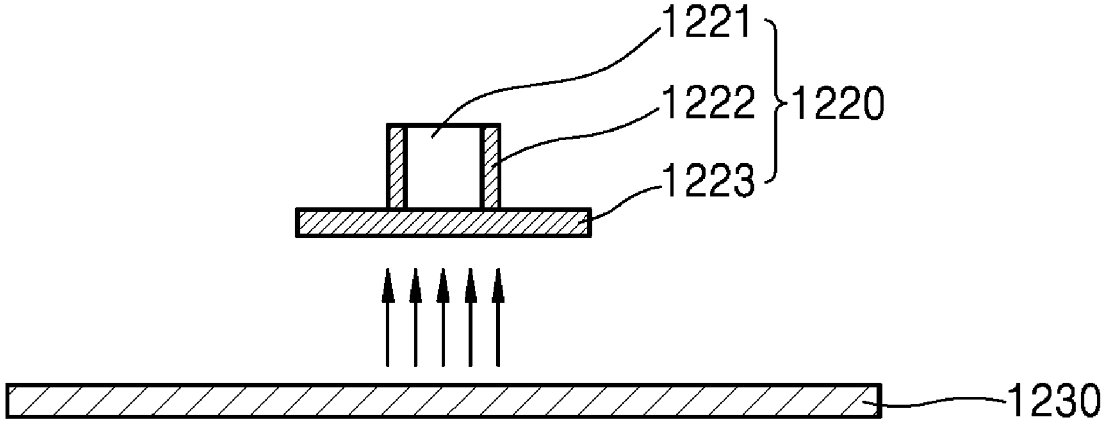

FIGS. 11 and 12 are views illustrating various embodiments of the step of preparing the first electrode terminal in step (c) in FIG. 9. FIG. 17 is a view illustrating various embodiments for forming the first electrode terminal in step (c), and FIG. 19 is a view illustrating a process in which the first sub-plate and the first electrode terminal are joined in step (d).

In the method of manufacturing a cap plate assembly according to still another embodiment of the present disclosure, as illustrated in FIG. 11, step (c) may include (c-1) preparing the core material portion 1221-1, (c-2) coupling the clad portion 1222 so that the clad portion 1222 surrounds the periphery of the core material portion 1221-1, (c-4) cutting, in the direction perpendicular to the length direction, the core material portion 1221-1 surrounded by the clad portion 1222, and (c-5) forming the first electrode terminal 1220 by joining the base portion 1223 having the flat plate shape to the cut core material portion 1221-1 and the lower portion of the clad portion 1222.

Step (c-1) and step (c-2) are identical to the above-mentioned steps.

Step (c-5) is a step of preparing the base portion 1223 and joining the core material portion 1221-1 and the clad portion 1222, which have been cut in step (c-4), to the base portion 1223.

Specifically, as illustrated in FIG. 17, step (c-5) is a step of joining the base portion 1223 and the clad portion 1222 by welding at least a part of the periphery of the clad portion 1222 to the upper portion of the base portion 1223.

For example, in step (c-5), the upper surface of the base portion 1223 and the periphery of the lateral surface of the clad portion 1222 may be welded and joined.

In this case, in step (d), as illustrated in FIG. 19, the first sub-plate 1230 may be joined to the base portion 1223 by welding, particularly laser welding.

In addition, in a method of manufacturing a cap plate assembly according to yet another embodiment of the present disclosure, as illustrated in FIG. 12, step (c) may include (c-6) preparing the core portion 1221 made of the first material so as to be joined to the first terminal plate 1210, and (c-7) forming the first electrode terminal 1220 by joining the first electrode terminal 1220 to at least a part of the outer surface of the core portion 1221 with the clad portion 1222 made of the second material so as to be joined to the first sub-plate 1230.

For example, in step (c-6), the core portion 1221 is prepared. In step (c-7), the first electrode terminal 1220 may be individually formed by stacking the clad portion 1222 on the periphery of the core portion 1221.

Figure 7:
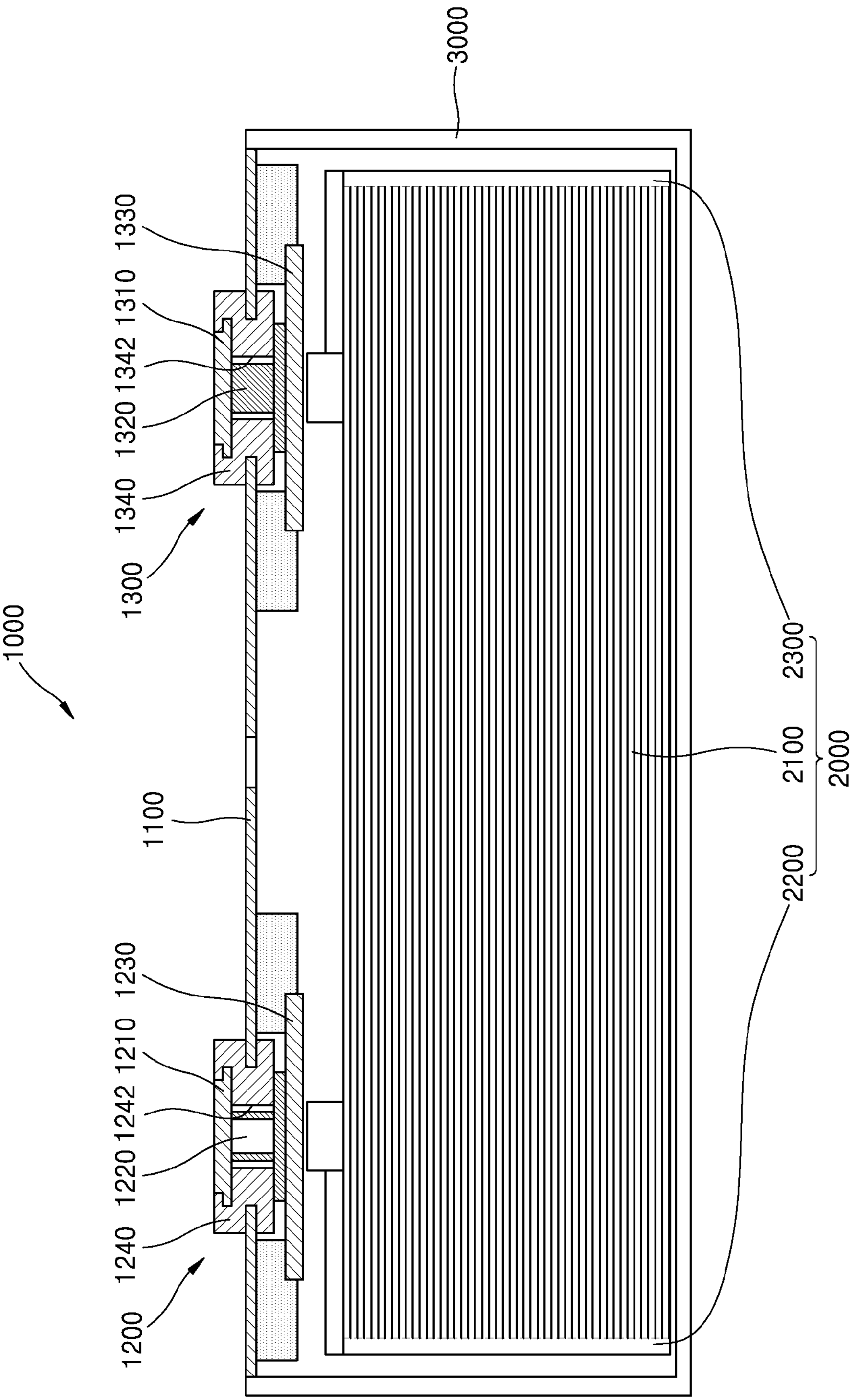
FIG. 7 is a cross-sectional view illustrating a battery cell according to the embodiment of the present disclosure.
Figure 8:
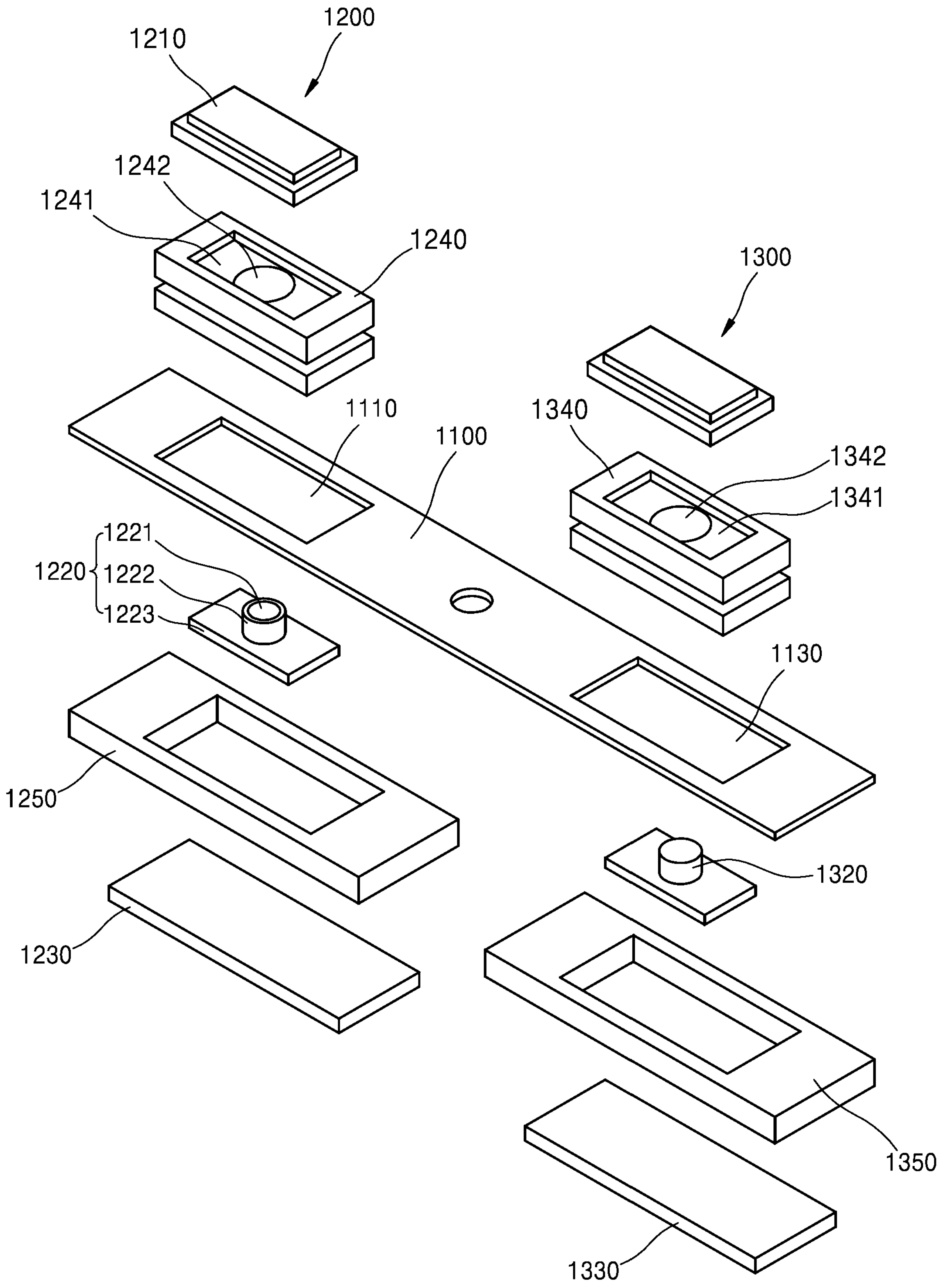
FIG. 8 is an exploded perspective view illustrating a cap plate assembly of the battery cell according to the embodiment of the present disclosure.

FIG. 7 is a cross-sectional view illustrating a battery cell according to the embodiment of the present disclosure, and FIG. 8 is an exploded perspective view illustrating a cap plate assembly of the battery cell in FIG. 7.

As illustrated in FIG. 7, the battery cell according to the embodiment of the present disclosure may include the electrode assembly 2000, the housing 3000, and a cap plate assembly 1000.

As illustrated in FIG. 7, the electrode assembly 2000 has a structure in which a first electrode 2200 and a second electrode 2300 are formed at two opposite surfaces of a separator 2100. Specifically, the electrode assembly 2000 may be assembled by stacking the first and second electrodes 2200 and 2300, which are respectively formed as single plates, with the separator 2100 interposed therebetween or assembled by folding the separator 2100, the first electrode 2200, and the second electrode 2300 in a zigzag shape and stacking the separator 2100, the first electrode 2200, and the second electrode 2300.

The housing 3000 is a casing having an electrode accommodation portion 3100 formed therein and accommodates the electrode assembly 2000. An opening portion may be formed at one side of the housing 3000 to couple the electrode assembly 2000, and the opening portion may be sealed by the cap plate assembly 1000 so that the electrode assembly 2000 and the electrolyte may be accommodated therein.

The cap plate assembly 1000 is formed to cover the upper side of the housing 3000. The cap plate assembly 1000 may include the first electrode part 1200 connected to the first electrode 2200 and installed in a conductive state on the cap plate 1100 having the first through-hole 1242 formed so that the inside and outside of the housing 3000 communicate with each other.

The first electrode part 1200 and a second electrode part 1300 may be selectively provided depending on a polarity. Alternatively, the first electrode part 1200 may include a negative electrode terminal installed in an insulated state on the cap plate 1100, and the second electrode part 1300 may include a positive electrode terminal installed in an insulated or conductive state on the cap plate 1100. In this case, the cap plate 1100 and the housing 3000 may be charged in a positive electrode state.

As illustrated in FIG. 8, the first electrode part 1200 may include the first terminal plate 1210, the first insulation part 1240, the first electrode terminal 1220, and the first sub-plate 1230.

The first terminal plate 1210 may be made of the first material, connected to the busbar at the position disposed outside the housing 3000, and seated and installed on the upper portion of the cap plate 1100.

The first terminal seating portion 1241 on which the first terminal plate 1210 is seated is formed on the upper portion of the first insulation part 1240, and the first through-hole 1242 is formed in the first accommodation hole 1110, such that the first terminal plate 1240 and the cap plate 1100 spaced apart from each other.

The first electrode terminal 1220 may be formed by stacking the first material and the second material, which is different from the first material, in the width or length direction of the cap plate 1100. The first electrode terminal 1220 may be inserted and coupled into the first through-hole 1242 so that the current is applied to the first terminal plate 1210 from the inside of the housing 3000.

In this case, the first electrode terminal 1220 may include the core portion 1221 made of the first material and having the upper surface joined to the first terminal plate 1210, and the clad portion 1222 made of the second material, formed to surround the outer surface of the core portion 1221, and having the lower surface joined to the first sub-plate 1230.

The first sub-plate 1230 may be made of the second material, connected to the first electrode terminal 1220 so as to apply the current to the first electrode terminal 1220, and connected to the lower portion of the first electrode terminal 1220.

The first terminal plate 1210, the first insulation part 1240, the first electrode terminal 1220, and the first sub-plate 1230 may include various embodiments, as illustrated in FIGS. 2 to 6 and be configured in the same way as the above-mentioned components.

The cap plate assembly 1000 may include the second electrode part 1300 connected to the second electrode 2300 and installed in an insulated state in a second through-hole 1342 formed in the cap plate 1100.

As illustrated in FIG. 8, the second electrode part 1300 may include a second terminal plate 1310, a second insulation part 1340, a second electrode terminal 1320, and a second sub-plate 1330.

The second terminal plate 1310 may be made of the first material and seated and installed on the upper portion of the cap plate 1100 so as to be connected to the busbar.

An upper surface of the second terminal plate 1310 may be formed in a shape corresponding to a shape of the busbar so that the second terminal plate 1310 is coupled to the busbar. The second terminal plate 1310 may be subjected to a surface treatment to improve current application efficiency when the second terminal plate 1310 is in contact with the busbar.

A protruding portion may be formed on a lateral surface of the second terminal plate 1310. The protruding portion may be formed along a periphery of the second terminal plate 1310, and a stepped portion having a lower portion further protruding than an upper portion thereof from the lateral surface of the second terminal plate 1310 may be formed.

The second terminal plate 1310 may be made of the first material, and the first material may include aluminum, an aluminum alloy, or the like.

A second terminal seating portion 1341, on which the second terminal plate 1310 is seated, may be formed on an upper portion of the second insulation part 1340.

The second terminal plate 1310 may be installed on the second terminal seating portion 1341, and the second insulation part 1340 may have a fixing groove portion into which the protruding portion is inserted so that the second terminal plate 1310 may be fixed to the second insulation part 1340.

The fixing groove portion may have a shape corresponding to the protruding portion and be formed at a position on the second insulation part 1340 that corresponds to the periphery of the second terminal plate 1310.

At least a part of the second insulation part 1340 may be formed on the upper portion of the cap plate 1100, and the second terminal seating portion 1341 is formed in a surface of the second insulation part 1340 opposite to the surface that adjoins the cap plate 1100, such that the second terminal plate 1310 and the cap plate 1100 are spaced apart from each other.

The second insulation part 1340 may have the second through-hole 1342 formed in a second accommodation hole 1130. Specifically, at least a part of the second insulation part 1340 may be formed inside the second accommodation hole 1130 so that an inner surface of the second accommodation hole 1130 is blocked from the outside.

In this case, the second accommodation hole 1130 is not filled with the second insulation part 1340. The second through-hole 1342, which is smaller than the second accommodation hole 1130, may be formed in the second accommodation hole 1130, and at least a part of the second electrode part 1300 may be inserted through the second through-hole 1342.

The second accommodation hole 1130 may be penetratively formed as a hole portion having various shapes such as a circular shape, an elliptical shape, or a quadrangular shape.

The second insulation part 1340 may be formed to surround the second accommodation hole 1130 of the cap plate 1100 and fix the second terminal plate 1310.

Specifically, the second insulation part 1340 may be formed together with the cap plate 1100 and the second terminal plate 1310 by insert-injection molding.

That is, the second insulation part 1340 may be formed by injecting a molten material to a periphery of the second accommodation hole 1130 of the cap plate 1100 and between the cap plate 1100 and the second terminal plate 1310 in a mold in which the cap plate 1100 and the second terminal plate 1310 are fixed.

In this case, the second insulation part 1340 may include conductive polymer resin.

The second insulation part 1340 is formed between the cap plate 1100 and the second terminal plate 1310 by insert-injection molding, such that the cap plate 1100, the second insulation part 1340, and the second terminal plate 1310 may be easily coupled without separate assembling processes.

The second terminal plate 1310 and the second insulation part 1340 may be easily fixed, and a portion between the second terminal plate 1310 and the second insulation part 1340 may be sealed without a seal such as a gasket.

The second sub-plate 1330 may be made of the first material, connected to the second electrode terminal 1320 so as to apply the current to the second electrode terminal 1320, and connected to a lower portion of the second electrode terminal 1320. For example, the second sub-plate 1330 is formed in a flat plate shape, one surface of the second sub-plate 1330 is joined to the second electrode terminal 1320, and the other surface of the second sub-plate 1330 is joined to the tab part in the housing, such that the current may be applied to the second electrode terminal 1320 from the tab part.

The terminal part made of the first material may be inserted and coupled into the second through-hole 1342 of the second electrode terminal 1320 so that the current is applied to the second terminal plate 1310 from the inside of the housing 3000.

The second electrode terminal 1320 may be made of the first material including aluminum, an aluminum alloy, and the like and formed as a single body. Therefore, the second sub-plate 1330, the second electrode terminal 1320, and the second terminal plate 1310 may be made of the materials having the same main component, thereby improving efficiency in transmitting electric power.

While the present disclosure has been described with reference to the embodiment illustrated in the drawings, the embodiment is described just for illustration, and those skilled in the art to which the present disclosure pertains will understand that various modifications of the embodiment and any other embodiment equivalent thereto are available. Accordingly, the true technical protection scope of the present disclosure should be determined by the technical spirit of the appended claims.

What is claimed is:

1. A cap plate assembly comprising:

a first electrode part installed in a conductive state on a cap plate formed to cover an upper side of a housing, configured to be connected to a first electrode, and having a first through-hole formed to allow communication between an inside and an outside of the housing; and a second electrode part installed in an insulated state in a second through-hole formed in the cap plate and configured to be connected to a second electrode, wherein the first electrode part comprises:

a first terminal plate made of a first material, connected to a busbar at a position disposed outside the housing, and seated and installed on an upper portion of the cap plate;

a first insulation part having an upper portion having a first terminal seating portion on which the first terminal plate is seated, the first insulation part having the first through-hole formed in a first accommodation hole and being formed to space the first terminal plate and the cap plate;

a first electrode terminal formed by stacking the first material and a second material, which is different from the first material, in a width or length direction of the cap plate, the first electrode terminal being inserted and coupled into the first through-hole to apply a current to the first terminal plate from the inside of the housing; and a first sub-plate made of the second material and connected to the first electrode terminal to apply the current to the first electrode terminal, the first sub-plate being connected to a lower portion of the first electrode terminal, and wherein the second electrode part comprises:

a second terminal plate made of the first material, configured to be connected to the busbar, and seated and installed on an upper portion of the cap plate;

a second insulation part having an upper portion having a second terminal seating portion on which the second terminal plate is seated, the second insulation part having the second through-hole formed in a second accommodation hole and being formed to space the second terminal plate and the cap plate;

a second electrode terminal made of the first material to apply a current to the second terminal plate from the inside of the housing, the second electrode terminal being inserted and coupled into the second through-hole; and a second sub-plate made of the first material and connected to the second electrode terminal to apply the current to the second electrode terminal, the second sub-plate being connected to a lower portion of the second electrode terminal.

2. The cap plate assembly of claim 1, wherein the first insulation part is formed on the cap plate and the first terminal plate by insert-injection molding so as to be formed between the cap plate and the first terminal plate.

3. The cap plate assembly of claim 1, wherein the first electrode terminal comprises:

a core portion made of the first material having an upper surface joined to the first terminal plate; and a clad portion made of the second material, formed to surround an outer surface of the core portion, and having a lower surface joined to the first sub-plate.

4. The cap plate assembly of claim 3, wherein the first terminal plate and the core portion are joined by laser welding, and the clad portion and the first sub-plate are joined by direct bonding.

5. The cap plate assembly of claim 1, wherein the first electrode terminal comprises:

a core portion made of the first material and having an upper surface joined to the first terminal plate;

a clad portion made of the second material and formed to surround an outer surface of the core portion; and a base portion having a flat plate shape, joined to the core portion and a lower portion of the clad portion, and disposed between the clad portion and the first sub-plate to be joined to the first sub-plate.

6. The cap plate assembly of claim 5, wherein the base portion and the clad portion are joined by performing welding along at least a part of a periphery of the clad portion on an upper portion of the base portion.

7. The cap plate assembly of claim 5, wherein the first terminal plate and the core portion are joined by laser welding, and the base portion and the first sub-plate are joined by laser welding.

8. The cap plate assembly of claim 1, comprising:

a third insulation part formed to be coupled to a lower portion of the cap plate to support the first sub-plate.

9. A method of manufacturing a cap plate assembly, the method comprising:

(a) preparing a cap plate formed to cover an upper side of a housing and having a first accommodation hole formed through at least a part of the cap plate so that an inside and an outside of the housing communicate with each other;

(b) installing a first terminal plate, which is made of a first material and seated and installed on an upper portion of the cap plate so as to be connected to a busbar at a position disposed outside the housing, on an upper portion of the cap plate, spacing the first terminal plate and the cap plate, and forming a terminal insulation part having a first through-hole formed vertically through the terminal insulation part;

(c) preparing a first electrode terminal formed by stacking the first material and a second material, which is different from the first material, in a width or length direction of the cap plate;

(d) joining a first sub-plate, which is made of the second material so as to apply a current to the first electrode terminal, to a lower portion of the first electrode terminal; and (e) inserting the first electrode terminal into the first through-hole and joining the first terminal plate to an upper portion of the first electrode terminal so that the current is applied to the first terminal plate from an electrode assembly in the housing, wherein step (c) comprises:

preparing a core material portion made of the first material to be joined to the first terminal plate, and extending by a predetermined length in a length direction;

coupling a clad portion, which is made of the second material to be joined to the first sub-plate, to surround a periphery of the core material portion; and forming the first electrode terminal by cutting, in a direction perpendicular to the length direction, the core material portion surrounded by the clad portion.

10. The method of claim 9, wherein in step (b), the terminal insulation part is formed by forming the cap plate and the first terminal plate by insert-injection molding so that the terminal insulation part is formed between the cap plate and the first terminal plate.

11. The method of claim 9, wherein the first sub-plate and the first electrode terminal are joined by direct bonding in step (d), and the first terminal plate and the core portion are joined by laser welding in step (e).

12. The method of claim 9, wherein the first electrode terminal is formed by joining a base portion having a flat plate shape to the cut core material portion and a lower portion of the clad portion.

13. The method of claim 12, wherein the base portion and the clad portion are joined by performing welding along at least a part of a periphery of the clad portion on an upper portion of the base portion.

14. The method of claim 12, wherein the first sub-plate and the base portion are joined by laser welding in step (d), and the first terminal plate and the core portion are joined by laser welding in step (e).

15. The method of claim 9, wherein step (c) comprises:

preparing a core portion made of the first material so as to be joined to the first terminal plate; and forming the first electrode terminal by joining a clad portion, which is made of the second material so as to be joined to the first sub-plate, to at least a part of an outer surface of the core portion.

16. The method of claim 9, comprising:

(f) coupling a sub-plate insulation part, which is formed to support the first sub-plate, to an upper portion of the first sub-plate prior to step (e).

17. A battery cell comprising:

an electrode assembly having first and second electrodes provided at two opposite surfaces of a separator;

a housing having an electrode accommodation portion therein and configured to accommodate the electrode assembly; and a cap plate assembly including a first electrode part connected to the first electrode and installed in a conductive state on a cap plate formed to cover an upper side of the housing and having a first through-hole formed to allow communication between an inside and an outside of the housing, and a second electrode part connected to the second electrode and installed in an insulated state in a second through-hole formed in the cap plate, wherein the first electrode part comprises:

a first terminal plate made of a first material and seated and installed on an upper portion of the cap plate to be connected to a busbar at a position disposed outside the housing;

a first insulation part having an upper portion having a first terminal seating portion on which the first terminal plate is seated, the first insulation part having a first through-hole formed in a first accommodation hole and being formed to space the first terminal plate and the cap plate;

a first electrode terminal formed by stacking the first material and a second material, which is different from the first material, in a width or length direction of the cap plate, the first electrode terminal being inserted and coupled into the first through-hole to apply a current to the first terminal plate from the inside of the housing; and a first sub-plate made of the second material and connected to the first electrode terminal to apply the current to the first electrode terminal, the first sub-plate being connected to a lower portion of the first electrode terminal, wherein the second electrode part comprises:

a second terminal plate made of the first material and seated and installed on an upper portion of the cap plate to be connected to the busbar;

a second insulation part having an upper portion having a second terminal seating portion on which the second terminal plate is seated, the second insulation part having a second through-hole formed in a second accommodation hole and being formed to space the second terminal plate and the cap plate;

a second electrode terminal made of the first material to apply a current to the second terminal plate from the inside of the housing, the second electrode terminal being inserted and coupled into the second through-hole; and a second sub-plate made of the first material and connected to the second electrode terminal to apply the current to the second electrode terminal, the second sub-plate being connected to a lower portion of the second electrode terminal.

18. The battery cell of claim 17, wherein the first electrode terminal comprises:

a core portion made of the first material and having an upper surface joined to the first terminal plate; and a clad portion made of the second material, formed to surround an outer surface of the core portion, and having a lower surface joined to the first sub-plate.

* * * * *